United States Patent [19]
Craig et al.

[11] 4,317,229
[45] Feb. 23, 1982

[54] SECTORED ANTENNA RECEIVING SYSTEM

[75] Inventors: Timothy P. Craig, Georgetown, Ky.; James R. Stimple, Santa Rosa, Calif.; Paul M. Erickson, Schaumburg, Ill.

[73] Assignee: Motorola, Inc., Schaumburg, Ill.

[21] Appl. No.: 124,484

[22] Filed: Feb. 25, 1980

Related U.S. Application Data

[63] Continuation-in-part of Ser. No. 35,745, May 3, 1979, abandoned, which is a continuation of Ser. No. 792,961, May 2, 1977, abandoned.

[51] Int. Cl.³ ............................................ H04B 7/08
[52] U.S. Cl. .................................. 455/277; 455/134; 455/135
[58] Field of Search ................ 455/272, 277, 133–136, 455/140

[56] References Cited

U.S. PATENT DOCUMENTS

| | | | |
|---|---|---|---|
| 3,206,679 | 9/1965 | Miller | 455/135 |
| 3,537,011 | 10/1970 | Escoula | 455/277 |
| 3,670,275 | 6/1972 | Kalliomaki et al. | 455/277 |
| 4,101,836 | 7/1978 | Craig et al. | 455/277 |
| 4,255,740 | 3/1981 | Ferrie | 455/135 |

FOREIGN PATENT DOCUMENTS 2534888  2/1977  Fed. Rep. of Germany ...... 455/277

*Primary Examiner*—Marc E. Bookbinder
*Attorney, Agent, or Firm*—James A. Scheer; James W. Gillman

[57] ABSTRACT

A plurality of horizontally directive antenna sectors are arranged in a configuration to receive signals from remote transmitters over a given angle in the horizontal plane. A scanning system is operative in one of several modes to sequentially couple each sector to a receiver. In its first mode, each sector is sequentially scanned with the peak signal level therefrom being compared to a reference level. If the signal level on any sector exceeds the reference level the scanner activates to its second mode wherein scanning of all sectors continues for a predetermined interval after which the system advances to a selective scanning mode wherein scan is limited to that sector with the largest stored signal level relative to the reference level, and to those sectors adjacent said sector for a predetermined time interval. At the end of this interval, scanning is inhibited and the receiver is coupled to that sector which exhibited the strongest relative signal level during the scanning sequences. In this listen mode, if the signal level from the sector falls to a minimum level or a coded squelch is undetected for a given period, the system reverts to the first scanning mode.

The system periodically updates the reference levels to account for changes in background noise or the presence of an interfering signal.

35 Claims, 44 Drawing Figures

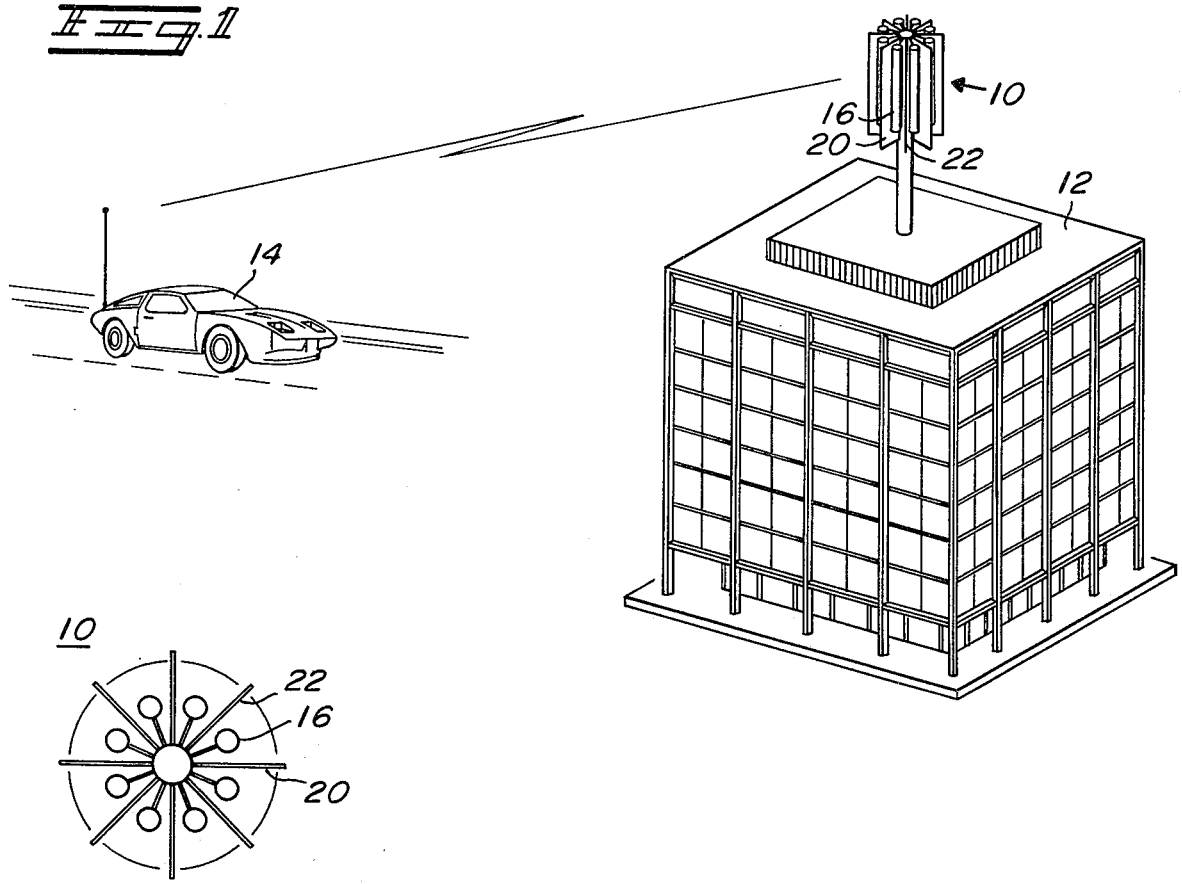
Fig. 1
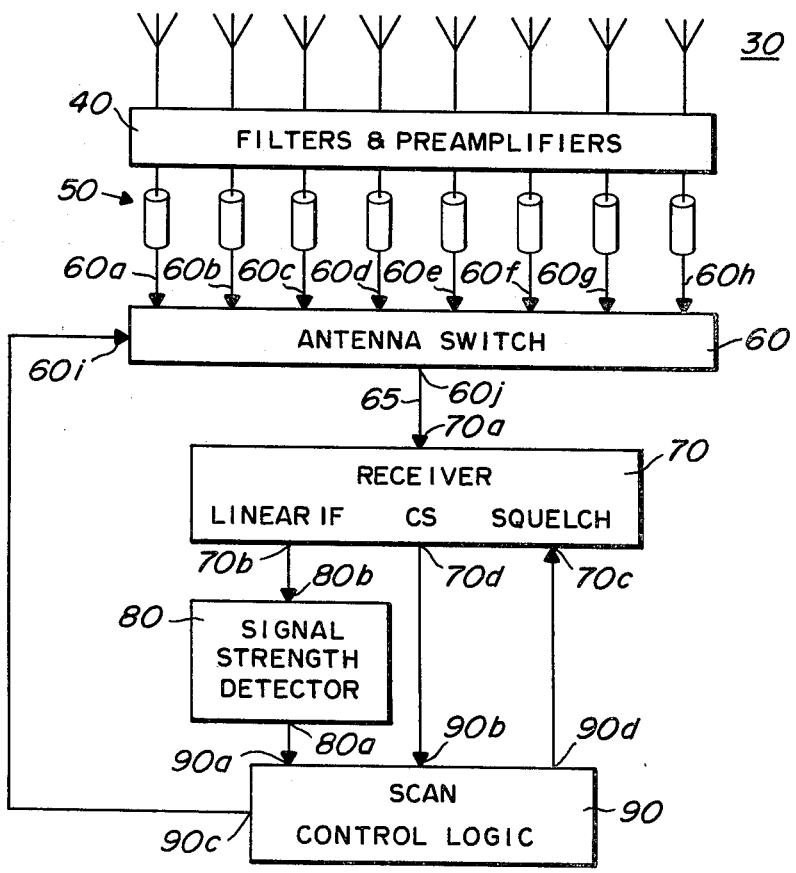
Fig. 2
Fig. 3

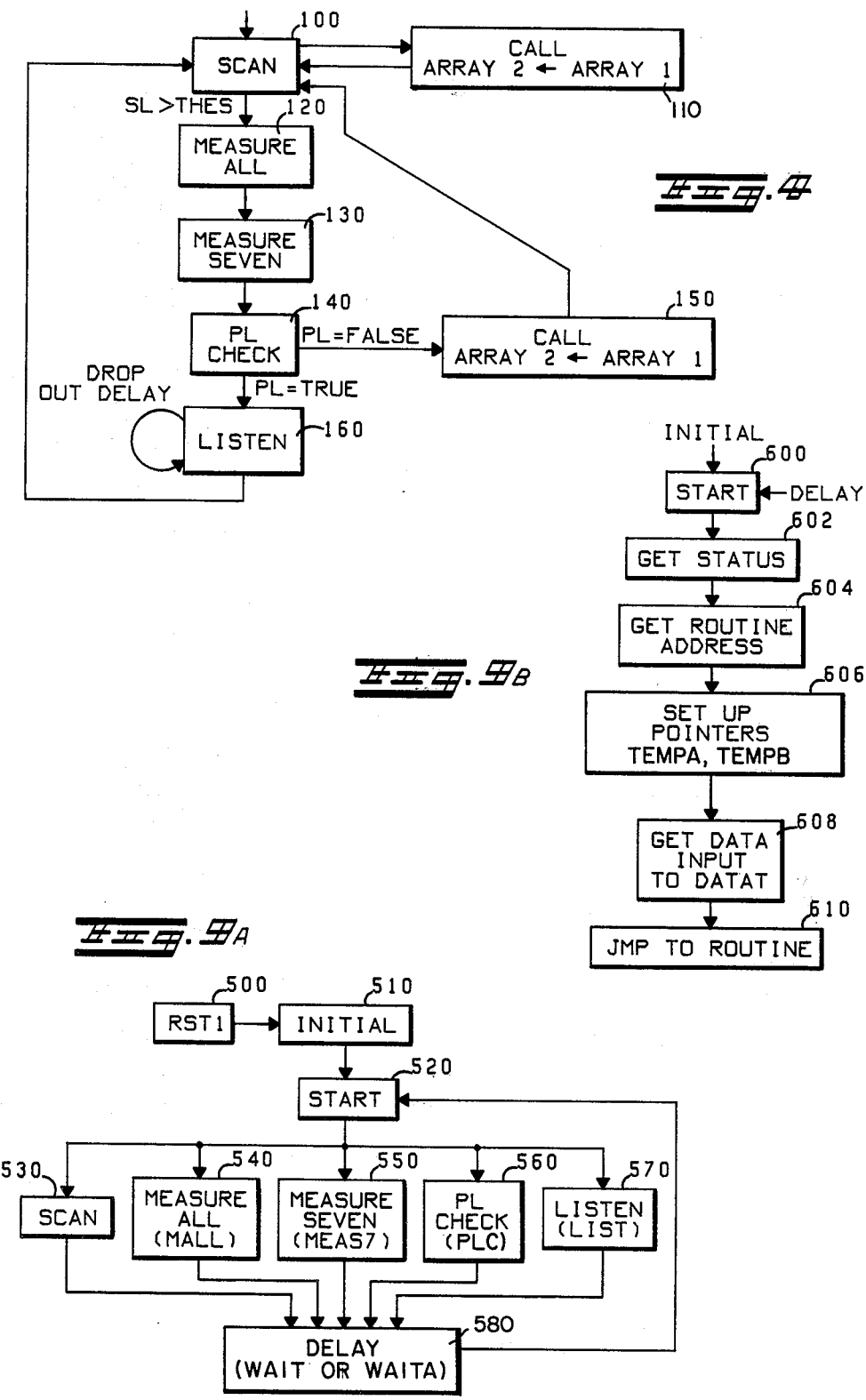

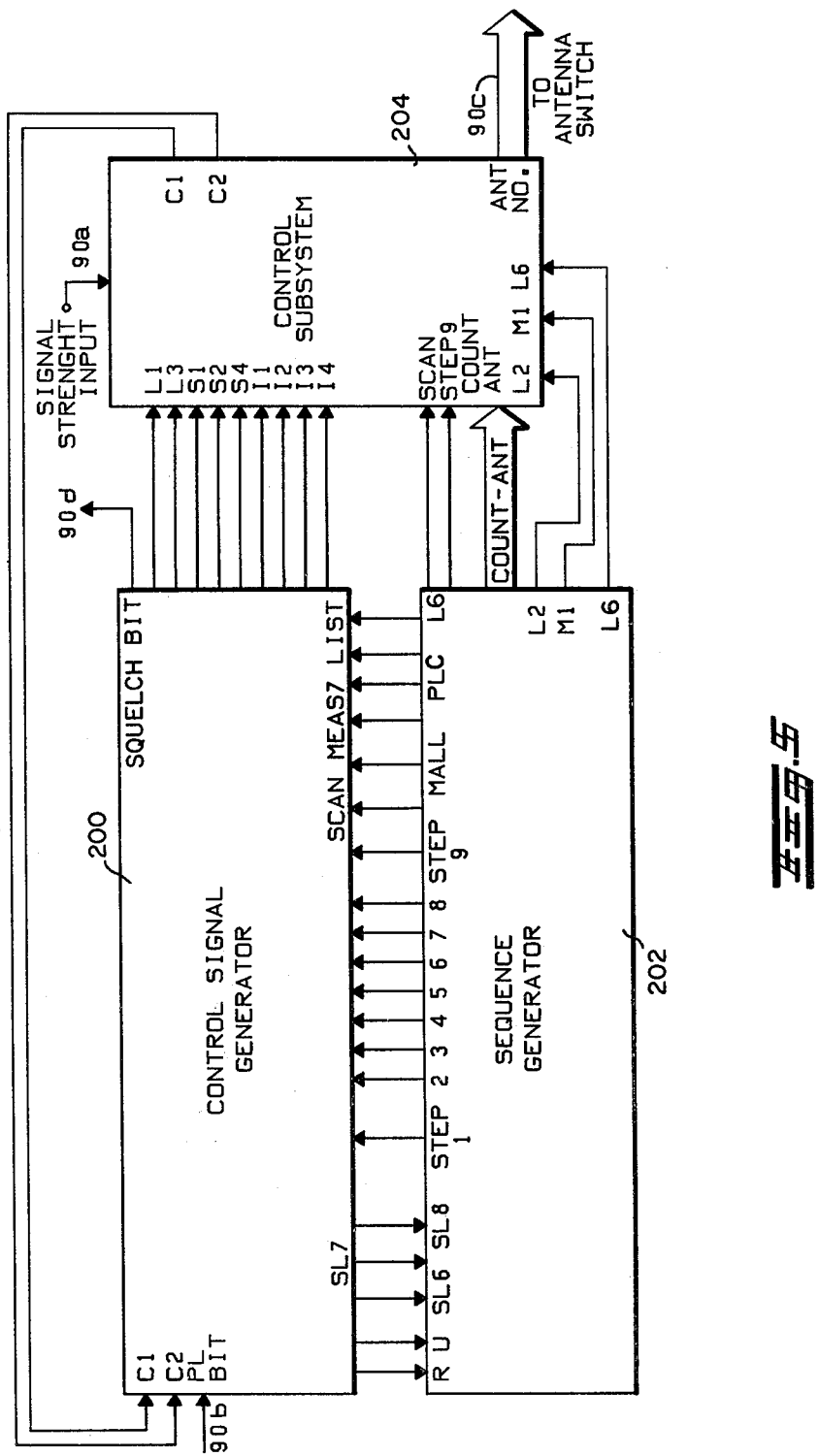

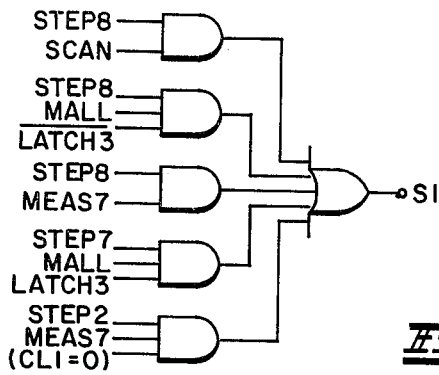
FIG. 7J
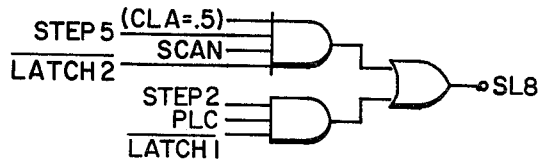
FIG. 7I
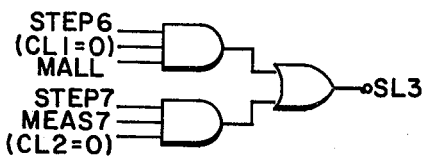
FIG. 7L
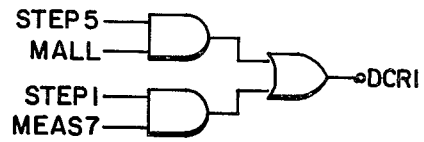
FIG. 7K
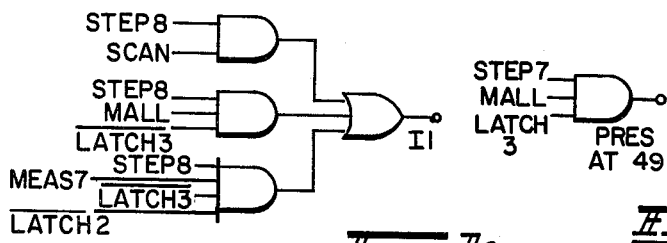
FIG. 7O    FIG. 7N    FIG. 7M
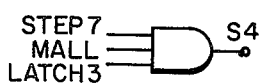
FIG. 7P
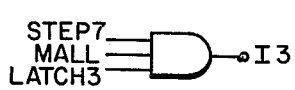
FIG. 7Q
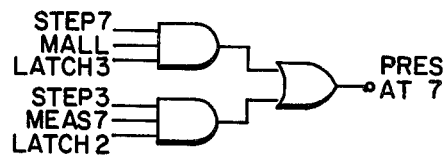
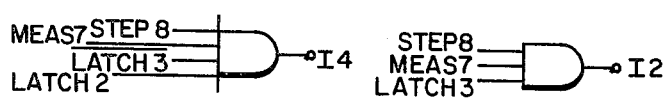
FIG. 7S    FIG. 7T
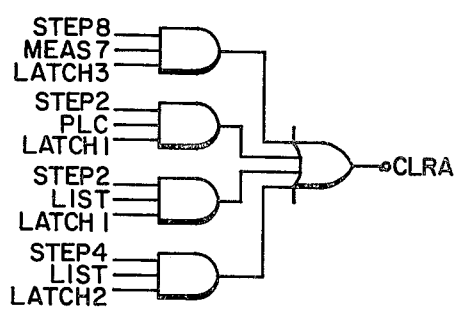
FIG. 7R
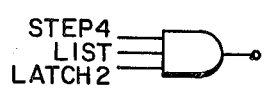
FIG. 7V
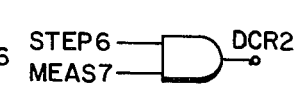
FIG. 7W
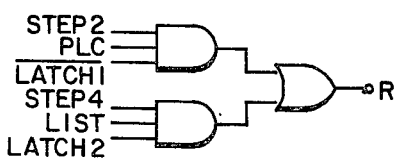
FIG. 7U

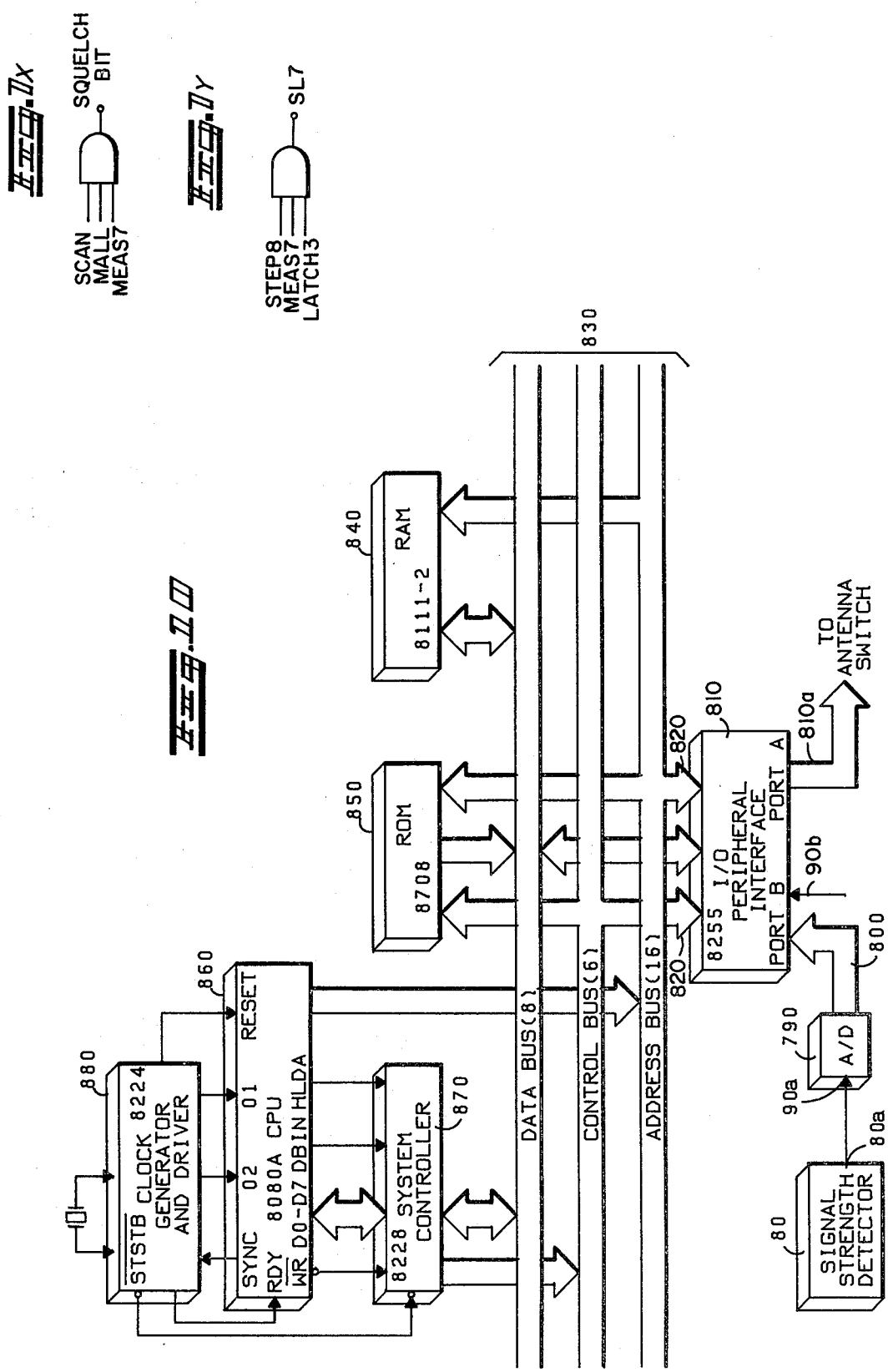

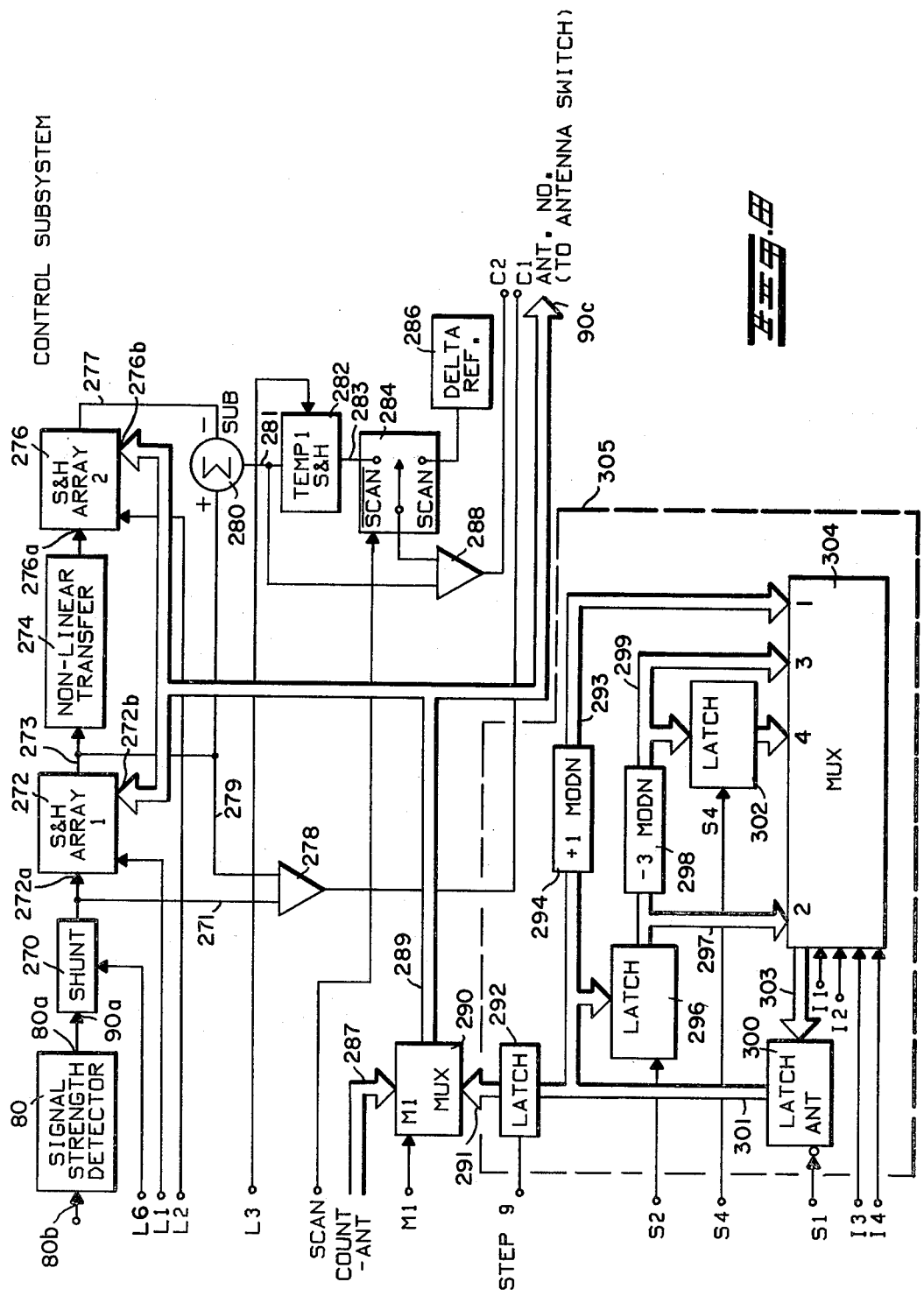

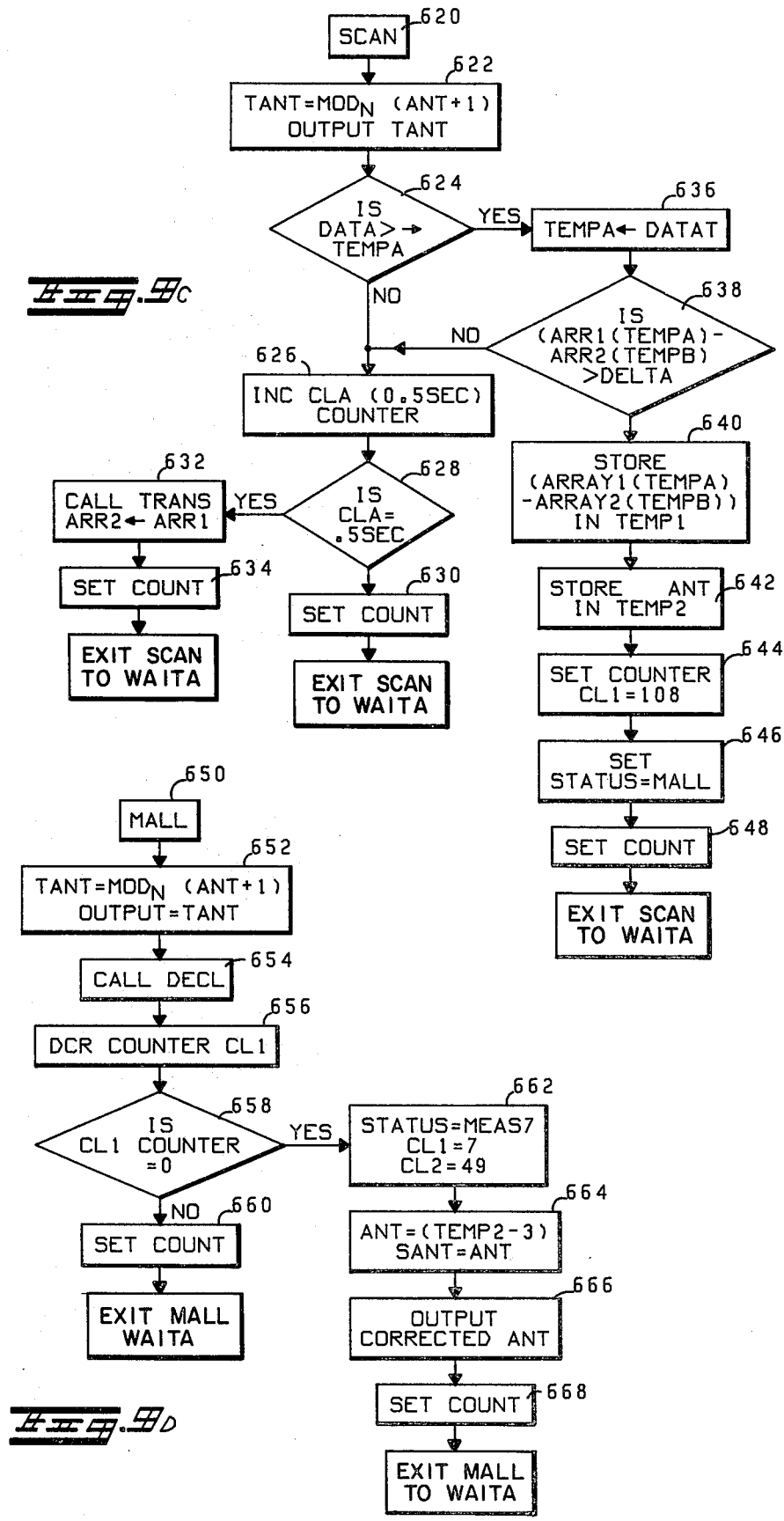

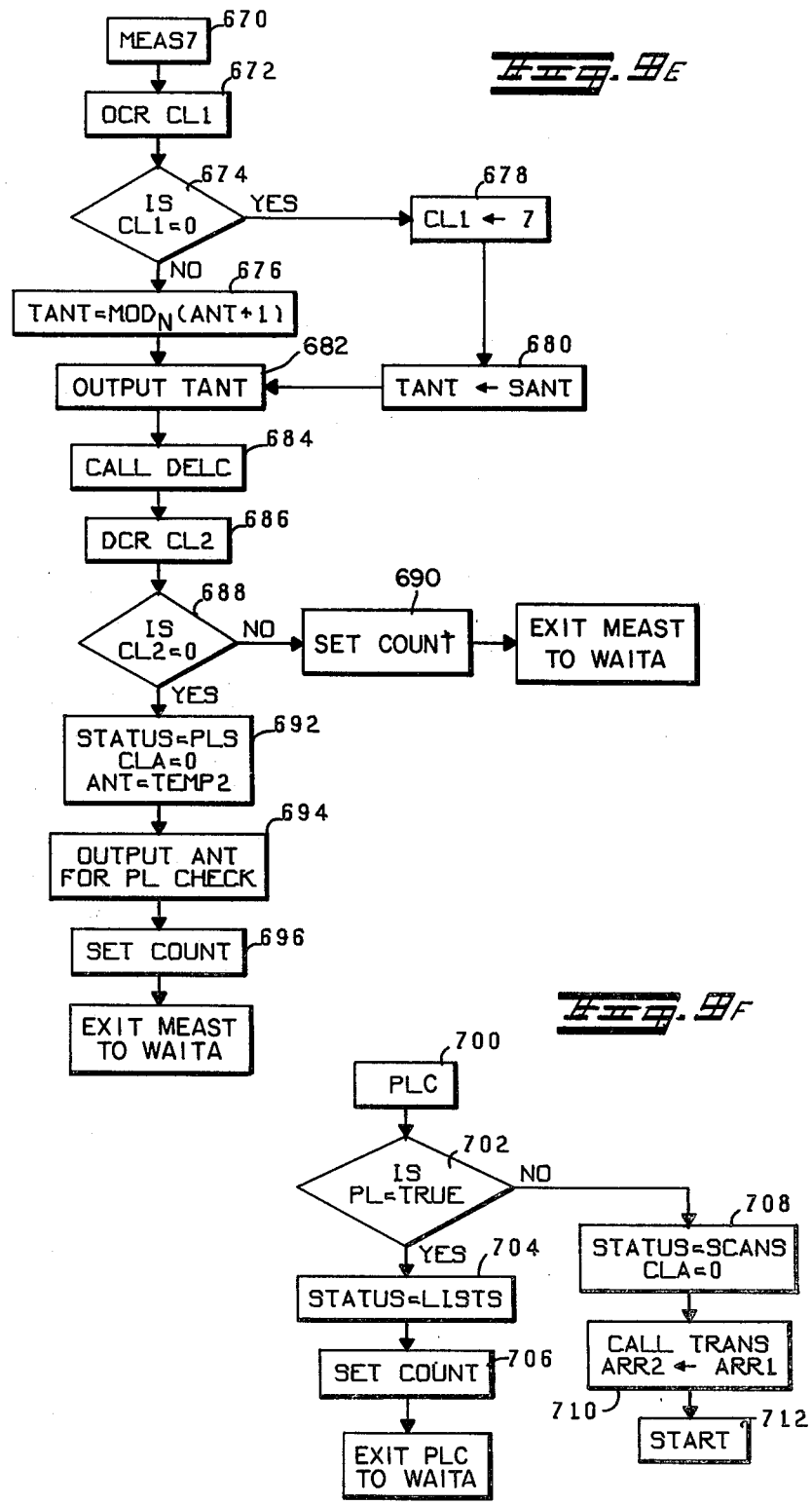

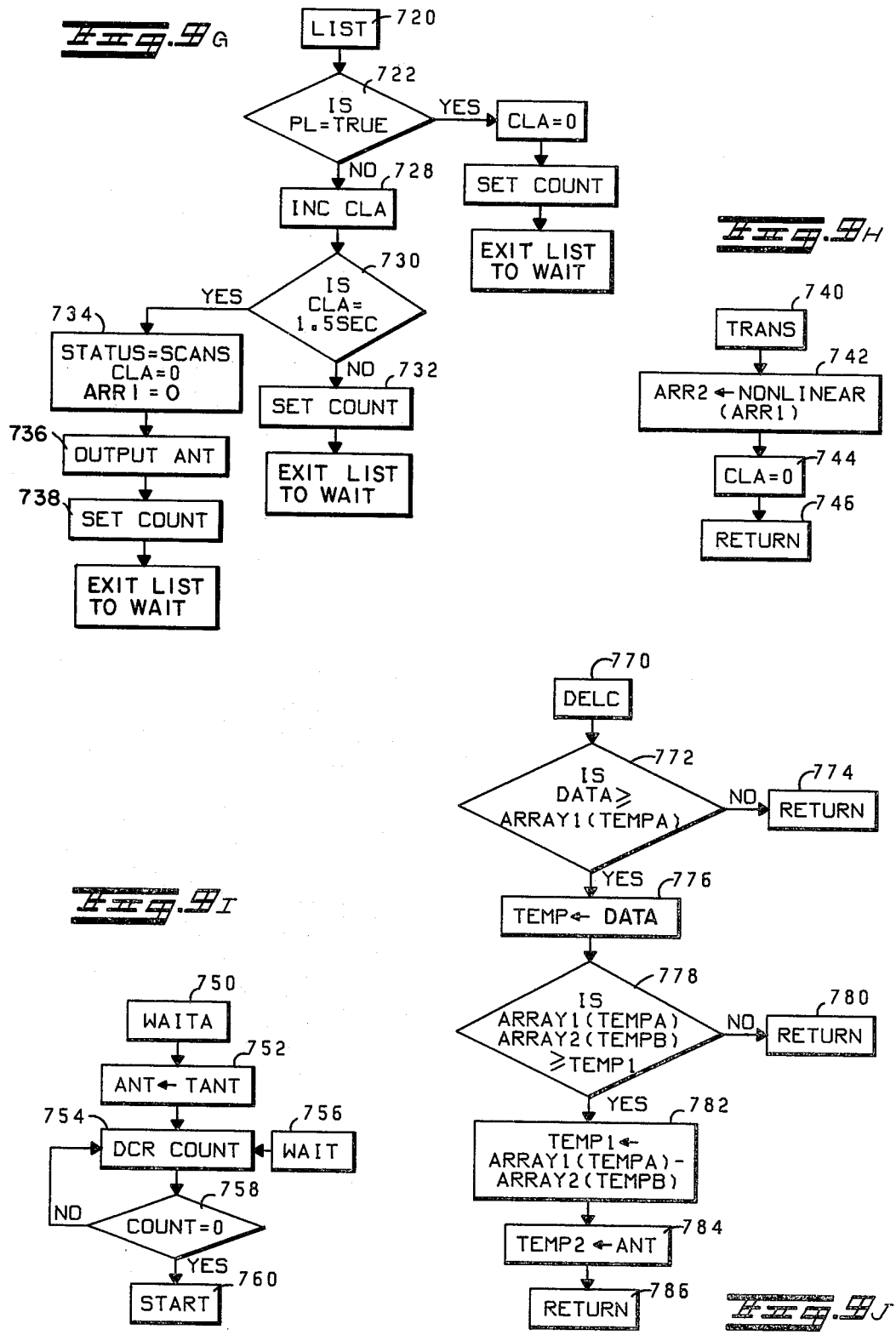

SECTORED ANTENNA RECEIVING SYSTEM

This application is a continuation in part of copending application Ser. No. 035,745, filed May 3, 1979, now abandoned which is a continuation of parent application Ser. No. 792,961, filed May 2, 1977, now abandoned entitled, "Sectored Antenna Receiving System," having the same inventor and assignee, and abandoned June 7, 1979.

BACKGROUND OF THE INVENTION

The present invention pertains to the radio communication art and, in particular, to a sectored antenna receiving system.

Several types of sectored antenna receiving systems have been developed for application in the radio frequency communication art. Such systems are commonly used in applications wherein the remote transmitter whose signal is to be received may be positioned in any one of multiple locations. Thus, such systems are normally designed in moving vehicle type applications. By using a sectored antenna array, as opposed to, for example, an omnidirectional antenna, the signal to noise performance can be significantly enhanced thus producing a superior communication system.

The prior art sectored array antenna systems, insofar as they relate to the present application, fall into two classes. The first class contemplates a multiple sector, single receiver arrangement in which the receiver is controlled by a sampling routine to continuously scan all sectors. Hence, for the condition wherein there is no received signal on any sector, the routine calls for the receiver to sample each sector for an equal period of time. Once a transmitted signal is detected on a sector, the duty cycle is changed whereby the receiver dwells on that sector for a disproportionate period of time. Nonetheless, the receiver continues to constantly sample the other sectors in anticipation of a stronger signal thereon.

The second class of sectored array receiving systems employs a pair of receivers. A search receiver constantly scans each sector in the array in an attempt to find that sector which receives the best signal. A service receiver is coupled to that sector with the best signal until the search receiver discovers that another sector is receiving a superior signal, at which time appropriate antenna switching is accomplished to the service receiver.

Such prior art scanning systems of the first class type have proven effective for applications wherein the remote transmitter is likely to jump from the coverage area of one sector to another sector in a reasonably short time as, for example, in the near range aircraft communication. However, for an application such as in land mobile systems the length of a communication message is sufficiently short compared to the coverage area of a sector and the speed of the vehicle such that a particular sector is likely to produce the best signal for the duration of the message. Such first class type prior art scanning systems are not desirable in applications such as the land mobile type since they necessarily require a constant switching from one sector to another resulting in an annoying gap in communication.

The prior art systems of the second class type have proven undesirable in that they require a pair of receivers. This significantly increases the cost of the system as well as system size while necessarily decreasing system reliability due to the duplication of parts.

In an application entitled "Sectored Antenna Receiving System," filed the same day as the original parent of this application and issued July 18, 1978, to Craig et al., U.S. Pat. No. 4,101,836, another approach is disclosed. In this system a multiple sector antenna, signal receiver arrangement is controlled by a sampling routine to continuously scan all sectors. When a transmitted signal is detected on a sector, the sampling routine activates to a second mode wherein scanning continues for a predetermined interval. At the end of the interval, scanning is inhibited and the receiver is coupled to that sector which produced the strongest level during the second mode scanning cycle. Once the signal level from the selected sector falls to a minimum level for a given time period the system reverts to the first scanning mode. This application is related to the subject matter disclosed in the above-mentioned application and is an improved sectored antenna receiving system.

SUMMARY OF THE INVENTION

It is an object of this invention, therefore, to provide a sectored antenna receiving system which is particularly adapted for use in applications such as of the land mobile type.

Briefly, according to the invention, a radio frequency communication system is provided with a multisectored antenna array. The array is scanned by sequentially sampling the signal from each sector and detecting the strength of the sample signal from each sector. The detected signal strength levels are compared to a reference level and it is determined whether the signal strength level of at least one sector exceeds the reference level. The scanning of the sectors of the array is continued for a predetermined interval subsequent to determination of a sector signal strength exceeding the reference level. After the predetermined interval of continuing to scan all of the sectors, selected sectors of the antenna array are scanned for another predetermined period. At the conclusion of the predetermined period of scanning only selected sectors, the scanning is inhibited and the receiver is coupled to a selected one of the selectively scanned sectors.

According to another feature of the invention, there is no scanning of selected sectors, however, the reference level is periodically updated using a nonlinear transformation of the sampled signal from each sector.

According to another feature of the invention, the system is activated to resume scanning the antenna array after scanning has been inhibited in response to the detected signal strength of the sector to which the receiver is coupled reducing a predetermined level for a predetermined time interval.

According to still another feature of the invention, the peak of the sampled signal strength levels from each sector are stored during scanning in a first storage array and the reference level for each sector is stored in a second storage array. The comparing is then performed between the values stored in the first storage array and the second storage array.

According to still another feature of the invention, the selected sector signal is checked for presence of a coded signal. If the coded signal is contained in the selected sector signal the scan is inhibited and the receiver remains coupled to the selected sector. If the selected sector signal fails to contain the coded signal, the system reverts to scanning all the antenna array sectors.

According to still another feature of the invention, the stored signal strength levels in the first storage array are transferred to the second storage array such that said transferred signals become the reference levels, whenever the selected sector signal initially fails to contain the coded signal.

The invention as described is particularly suited for land mobile sectored communications systems. In such systems the length of any given message is generally short compared to the time it would take for the vehicle to move from the area covered by one sector to that covered by another sector. Thus, once a sector is selected according to the invention, that sector can be used to receive for the duration of the message transmitted. In addition, the use of the selective scanning provides improved sector selection and the updating of the reference levels improves performance in environments of high noise and co-channel interference.

BRIEF DESCRIPTION OF THE DRAWINGS

FIG. 1 illustrates an eight sector horizontally directive antenna array mounted atop a building, which array is suitable for communication with a remotely located vehicular transmitter.

FIG. 2 is a top view of the eight sector antenna array shown in FIG. 1.

FIG. 3 is a generalized block diagram of the sectored antenna receiving systemm according to the invention.

FIG. 4 is a generalized flow diagram illustrating the sequence of operation of the scan control logic according to the invention.

FIG. 6 is a detailed circuit diagram of the sequence generator of the scan control logic.

FIG. 8 is a detailed circuit diagram of the control subsystem of the scan control logic.

FIG. 9A is an overall program flow diagram of the computer program for the scan control logic; and FIG. 9B is a program flow diagram of the START routine of computer program for the scan control logic.

FIG. 9C is a program flow diagram of the SCAN routine of computer program for the scan control logic.

FIG. 9D is a program flow diagram of the MALL routine of computer program for the scan control logic.

FIG. 9E is a program flow diagram of the MEAS7 routine of computer program for the scan control logic.

FIG. 9F is a program flow diagram of the PLC routine of computer program for the scan control logic.

FIG. 9G is a program flow diagram of the LIST routine of computer program for the scan control logic.

FIG. 9H is a program flow diagram of the TRANS subroutine of computer program for the scan control logic.

FIG. 9I is a program flow diagram of the DELAY routine of computer program for the scan control logic.

FIG. 9J is a program flow diagram of the DELC subroutine of computer program for the scan control logic.

FIG. 10 illustrates a microcomputer implementation of the preferred embodiment of the scan control logic.

DETAILED DESCRIPTION OF THE PREFERRED EMBODIMENT

Figure 5:
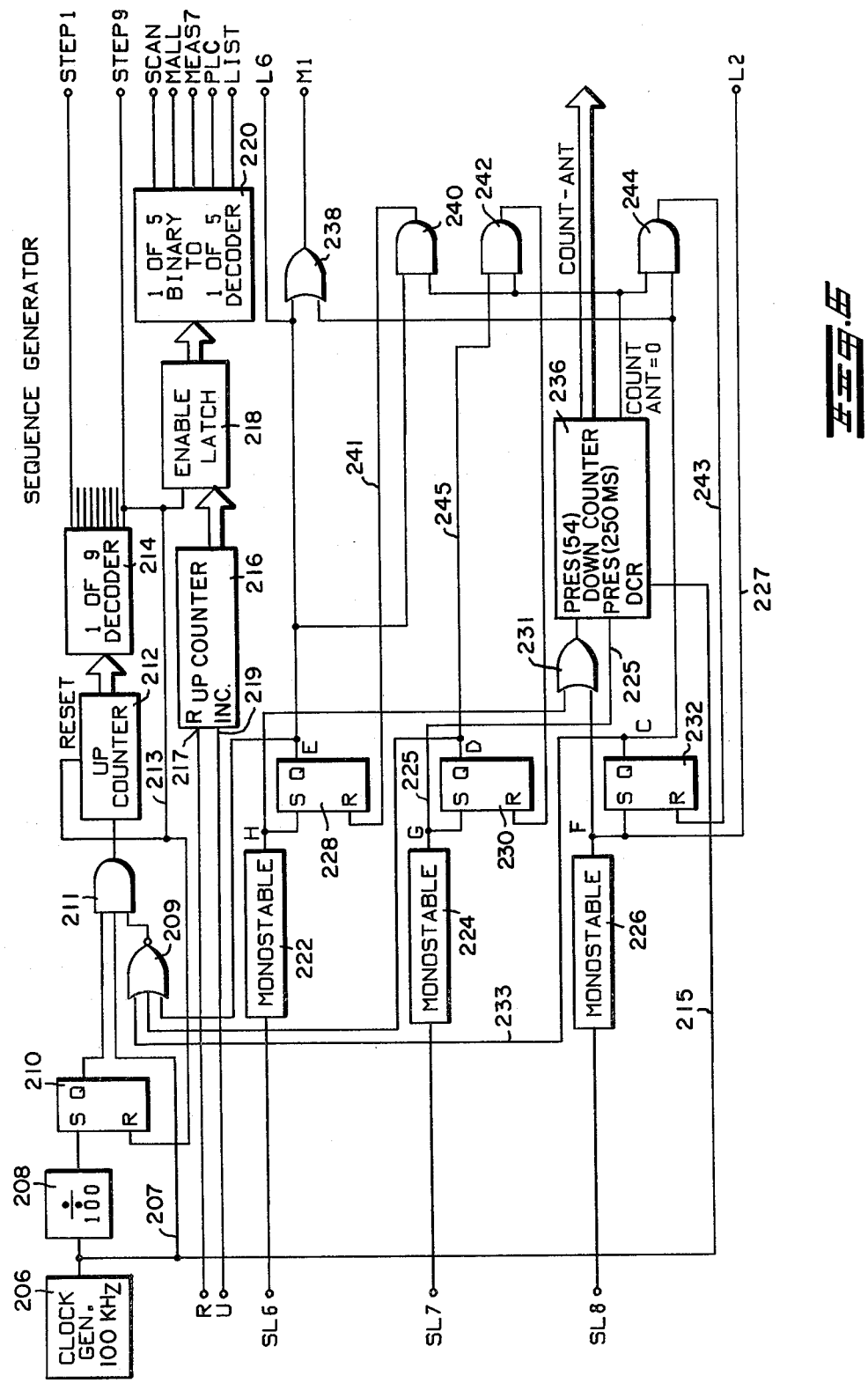
FIG. 5 is a block diagram of the discrete circuit embodiment of the scan control logic.

FIG. 1 illustrates an application of the invention used as a communication system for land mobile operation. Here, a sectored antenna array 10 is shown mounted atop a building 12. Communication from the array is to be established with a remotely located transmitter, which is illustrated as being carried by the vehicle 14.

The array 10 includes eight sectors, one of which is indicates at 16, which are nestled between 45% angle reflectors, two of which are indicated at 20 and at 22. Each sector is horizontally directive and is predeterminedly oriented with respect to the remaining sectors in the array, and are capable of covering a total horizontal angle of 360°. It should be understood that, depending upon the particular application, any number of sectors may be employed and the sectors may be arranged to cover any desired receiving angle. For example, for the preferred embodiment of the invention a 54 sector system was chosen.

Horizontally directive antenna sectors are well known in the antenna art and are commercially available from many manufacturers such that a detailed description thereof is unnecessary.

FIG. 2 is a top view of the antenna array 10 showing the eight antenna elements, one of which is indicated at 16, and the 45° reflectors, two being shown at 20, 22. As a result of the design of the antenna sector and its corresponding reflectors, each antenna sector is capable of receiving transmitted signals which are generated from within a defined horizontal angle. It should be understood that since each sector of the antenna array is directional, the array is capable of superior signal to noise performance over an omnidirectional antenna. The fact that the sectors are horizontally directive further enhances the signal to noise characteristics.

FIG. 3 is a generalized block diagram which illustrates the fundamental building blocks of the preferred embodiment of the invention. Here, the array of sectored antenna elements 30 are mounted, as for example, in FIG. 1, in determined orientation on top of a suitable structure. Each antenna sector feeds to a filter and preamplifier circuit 40 which provides gain to the sector received signals at those frequencies of interest. The amplified sector received signals pass over a set of coax cables 50 to an antenna switch 60. The antenna switch 60 comprises a plurality of input terminals 60a–60h, an output terminal 60j and a control input 60i. In response to control signals received at its control input 60i, the antenna switch 60 couples a selective one of the sectors 30 to the antenna switch output terminal 60j. Suitable switches are well known in the antenna art.

The output 60j from the antenna switch 60 is coupled via a suitable conductor 65 to the input 70a of a radio frequency receiver 70. Radio frequency receiver 70 is of conventional design in that it mixes the input radio frequency signals to an intermediate frequency, thereafter filtering the signals via an intermediate frequency stage, detecting the signals and reproducing the signals as audio or data outputs. The output from the intermediate frequency stage is available at a receiver output terminal 70b. The receiver includes conventional squelch circuitry such that when an appropriate signal is applied at a squelch input terminal 70c the output from the receiver may be disabled.

In addition, the receiver includes decoding circuitry capable of detecting the presence of a coded signal on the incoming sector received signal. Such coding systems are very common in land mobile communications systems and normally would include information as to the identity of the transmitting station as well as other pertinent information of use to the system. Commonly, such coded signals are predetermined subaudible or audible tones which may be decoded by the presence of suitable bandpass filters, vibrating reeds, or the like. A second output 70d from the receiver is activated in response to the receiver decoding the presence of a coded signal on the sector received signal.

The intermediate frequency output 70b from the receiver is coupled to a signal strength detector 80 which, as is shown in FIG. 3, may be a separate unit, or it may be incorporated within the receiver 70. The signal strength detector 80 produces a signal at its output 80a, which signal is indicative of the level of signals received at its input 80b. The signal strength signals are in turn passed to the first input 90a of a scan control logic circuit 90, where the maximum signal level for each sector is stored in a first sample and hold array. The second input 90b of the scan control logic 90 couples to the coded signal output 70d of the receiver 70. The scan control logic circuitry 90 processes its input signals and produces appropriate control signals on its first output 90c which are in turn coupled to the control input 60i of the antenna switch 60. Also, appropriate signals are created at the scan control logic second output 90d which are coupled to the squelch input 70c of the receiver 70. Detailed operation of the scan control logic 90 is fully described herein below.

Basically, the scan control logic 90 of FIG. 3 responds to signals at it signal strength input 90a to operate the sectored antenna receiving system in one of a number of modes. In the scan mode, the signal from each antenna sector is sampled and stored sequentially. This scanning continues until a signal of desired level is detected causing the scan control logic 90 to shift the system to a second mode in which each antenna sector continues to be sampled sequentially but only for a predetermined period. At the end of the predetermined time period, the control logic 90 shifts the system to a third mode, sampling for another predetermined period that sector with the highest relative signal level detected during the previous mode, as well as a predetermined number of sectors on each side of the selected sector.

At the conclusion of the third mode, the scan control logic stops the scanning and couples the receiver to the sector with the highest relative signal amplitude during the previous two scan modes.

The scan control logic first moves the system into another mode within the selected sector with the highest relative signal is checked for the presence of a coded squelch signal or the carrier squelch signal while the scanning is inhibited. If a squelch signal is present, the receiver is coupled to selected sector. If the coded squelch signal is not present, the scan control logic 90 returns the system to the first scan mode.

The functional flow diagram of FIG. 4 illustrates in greater detail the function of the scan control logic of FIG. 3. Referring to FIG. 4, in scan mode 100, the peak signal strength level received by each sector is stored in a first sample and hold array designated as Array 1 in FIG. 4. A predetermined minimum level is established by stored values for each sector in a second sample and hold array designated Array 2 in FIG. 4. For the condition wherein none of the sectors receives an input signal above a minimum level, a control signal from the scan control logic (see FIG. 3), applied to the control input terminal 60i of the antenna switch 60 (see FIG. 3), causes the receiver to continue to be sequentially coupled to each of the antenna sectors. If an input signal of sufficient amplitude is not detected for a predetermined period, the values in the first array are transferred to the second array to update the reference level as indicated by block 110. Once a sector receives a signal whose amplitude in such that the output from the signal strength detector is a minimum amount (referred to as $\Delta V$ and chosen to permit desired sensitiviy while allowing the system to reject noise) above its given reference threshold level, the scan control logic operates the system in a second, or continuing scan mode referred to as the "measure all" mode 120. In this mode 120, each antenna sector is again scanned for a predetermined scan time, with the maximum signal strength from each sector being stored in the first sample and hold array within the scan control logic. The predetermined time period is preferably long enough for at least one complete scan of all sectors. At the end of the predetermined sampling period, that sector which recorded the largest $\Delta V$ during both scanning intervals is identified.

The previously mentioned sectored antenna system disclosed by Craig, et al. in U.S. Pat. No. 4,101,836 and assigned to Motorola, Inc., functions substantially as described up to this point. The instant invention provides improved sector selection by addition of a "measure seven" mode, as well as improved handling of noise and interference by means of reference updating techniques. These novel features are described in detail below.

In accordance with one feature of the invention, after the sector which recorded the largest $\Delta V$ during the previous scan modes is identified, the novel scan logic disclosed herein proceeds to operate in a new "measure seven" mode 130 (see FIG. 4). In this mode the scan logic identifies those sectors located in predetermined orientation with respect to the identified sector. For example, in the preferred embodiment of the invention the 54 sectors are arranged to cover a full 360° horizontal angle. Once a particular sector is identified as having received the strongest relative signal, also selected are the three sectors on each side of the identified sector. Now, the scan control logic causes the system to operate in a selective scan mode wherein, for a predetermined time interval, only the selected seven sectors are scanned. This predetermined time interval is preferably chosen to permit all seven sectors to be scanned at least once. As before, the peak signal level from each sector is stored in the first sample and hold array.

Following the selective scan interval further scanning is inhibited and the receiver is coupled to that one of the selected sectors whose first array stored signal level exhibits the strongest increase over its second array stored signal (Listen Mode 160 in FIG. 4) and the scan logic moves to a PL check mode 140. In the PL check mode 140 the sector exhibiting the greatest increase of its first array stored signal over its second array stored signal is checked for the presence of a squelch signal (CS). Scan is inhibited for a predetermined time interval while looking for the squelch signal. If the system is operated so that it only responds to signals which contain a predetermined coded signal (PL) then the squelch signal will be generated when the coded signal is present. If the system is operated using only carrier squelch, then the squelch signal will be generated when the carrier is present. If the squelch signal is present scanning remains inhibited and the receiver is coupled to said sector. At this point the scan control logic in mode 140 causes the receiver to unmute and the receiver remains coupled to the selected sector until the squelch signal cannot be detected for a predetermined interval, at which time the first array is set to zero and the system reverts to the general scan mode. If, however, the selected sector does not contain the squelch signal, indicative that the incoming signal is from an interferer, the peak values stored for the interferer in the first array are transferred to the second array as indicated by block 150, to be thereafter used as the reference level.

In accordance with one feature of the invention a nonlinear transfer, which expends the stronger signal values so that a strong signal condition requires an effectively larger $\Delta V$ (i.e., larger signal to interference difference) may be used to transfer first array values to the second array. This allows a weak signal to be accepted over noise more readily than a strong signal is accepted over cochannel interference. The, the system reverts to the general scan mode and operation proceeds as before. By loading the interferers stored signals into the second array, the system may then "ignore" the interferer on subsequent scans and look for a received signal which does contain the proper coded signal.

It should be pointed out that in land mobile sectored communication systems, the length of any given message is generally short compared to the time it would take for the vehicle to move from the area covered by one sector to that covered by another sector. Thus, once the scan control logic determines which of the sectors is receiving the best signal from the mobile, that sector is coupled to the receiver for the duration of the message transmitted thereto.

FIG. 5 illustrates in block diagram form the structure of the discrete circuit embodiment of the scan control logic circuitry 90 of FIG. 3 based on a 54 sector system. The signal strength levels from the signal strength detector are applied to a scan control subsystem 204 at its signal strength input 90*a*. Circuitry in the scan control subsystem 204 processes the signal strength input and generates an antenna number in a proper sequence which is coupled to antenna switch 60 (see FIG. 3) from the control subsystem output 90*c*. The coded signal output 70*d* of the receiver 70 shown in FIG. 3 is coupled to a coded signal (hereinafter referred to as the PL bit) bit input 90*b* of a control signal generator 200. The control signal generator 200 generates appropriate control signals for the control subsystem and a sequence generator 202. In addition, the control signal generator 200 generates a Squelch Bit signal on output 90*d* which is coupled to the squelch input 70*c* of the receiver 70 shown in FIG. 3. The sequence generator 202 generates the necessary sequence control signals for the control signal generator and the control subsystem to permit proper sequencing of the various scan modes.

FIG. 6 is a detailed diagram of the sequence generator 202 of FIG. 5. The clock generator 206 in FIG. 6 is in this embodiment a 100 KHz frequence source. The output of clock generator 206 is coupled directly to a divide by 100 divider 208. This results in an output signal from divider 208 which has a period of one millisecond, which will cause scanning of one antenna sector every one millisecond. The pulses from divider 208 triggers the S input of flip flop 210. The Q output of flip flop 210 is then coupled directly to AND gate 211. In addition, the clock generator 206 is coupled directly to AND gate 211 via line 207. The result is that the output of AND gate 211 will be a pulse train which is a mirror image of the clock pulses from clock generator 206 during the time that the Q output of flip flop 210 is high. This pulse train is coupled directly to up counter 212 which will count the pulses through 9 steps. The output from up counter 212 is then coupled directly to a one of nine decoder which generates a set of pulses in sequence on its nine outputs step 1 through step 9. When the pulse is generated on step 9, it is coupled back to the R input of flip flop 210, thus resetting flip flop 210. This will disable AND gate 211 thus stopping the pulse train into up counter 212 until the next one millisecond pulse is generated out of divider 208. At the same time the step 9 pulse is fed back via line 213 to reset up counter 212. In this way a set of sequence pulses on output step 1 through step 9 are generated every one millisecond.

Inputs SL6, SL7 and SL8 are latch setting inputs which are coupled directly to monostables 222, 224, and 226 respectively. The output of each of these monostable multivibrators is a latch setting pulse indicated as signal H for monostable 222, signal G for monostable 224, and signal F the monostable 226. The latch setting pulse H is coupled to the set input of latch 228, pulse G is coupled to the set input of latch 230, and pulse F is coupled to the set input of latch 232.

The setting of latch 232 has the effect of transferring data from ARRAY 1 to ARRAY 2. The output of monostable 226 signal F is also coupled via line 227 to output L2. L2 is coupled to the control system 204 where it will control loading of sample and hold ARRAY 2. In addition, pulse F is coupled directly to OR gate 231 which will cause down counter 236 to preset to an antenna number equal to the number of antenna sectors in the system (54 in this embodiment). At the same time, pulse F will trigger flip flop 232 causing the Q output C to go high. The signal C is coupled directly to AND gate 244. The second input to AND gate 244 is the zero count output from down counter 236. When both of these inputs are high, AND gate 244 will reset latch 232 via line 243. When the output C of 232 is high, OR gate 238 goes high generating a signal on output M1. The signals on M1 and on L2 are coupled to the control subsystem 204 causing transfer of data from ARRAY 1 to ARRAY 2. In addition, output C of latch 232 is coupled to NOR gate 209 via line 233. Thus, when output C goes high, the output of NOR gate 209 will go low thus disabling AND gate 211 and stopping the generation of the sequence steps 1–9. However, since the output pulses from clock 206 are coupled directly to the decrement of down counter 236 via line 215, the down counter will continue to decrement. This will generate the antenna number to address the sample and hold memory cells of ARRAY 1 and ARRAY 2 during the transfer of data or during the zeroing of ARRAY 1. When down counter 236 reaches a zero count, the AND gate 244 will be enabled resetting latch 232 thus causing signal C to go low which disables NOR gate 209, and enables AND gate 211 allowing the step sequence 1 through 9 to continue.

Latch 228 when set will have the primary effect of zeroing out ARRAY 1 via the signal on line L6 which will cause the control subsystem to apply zero values to the input of ARRAY 1. When the signal H is generated out of monostable 222, it will set latch 228 generating signal E at the output Q and will preset down counter 236 through OR gate 231 to the number equal to the number of antenna sectors. E is coupled directly to NOR gate 209 thus inhibiting AND gate 211 and thus freezing the step generating circuits during the zeroing of ARRAY 1. Signal E is also coupled to OR gate 238 to generate a signal on M1 which will cause the count-ant number to be applied to ARRAY 2 during the zeroing of ARRAY 1. In addition, output E is coupled directly to AND gate 240 so that when the count antenna equals zero from down counter 236, AND gate 240 wil generate a reset signal resetting latch 228 via line 241 thus ending the zeroing of ARRAY 1. Once latch 228 is reset then AND gate 211 will be enabled and the step sequencing will continue.

The output signal G generated from monostable 224 has the primary effect of causing a predetermined (250 millisecond) delay to allow PL bit detection by presetting a number (which will take 250 milliseconds to count down) into down counter 236 via line 225. In addition, signal G is coupled directly to the set input of latch 230 so that when signal G is generated, latch 230 is set generating a signal D on output Q of latch 230. Signal D is coupled directly to AND gate 242 via line 245 so that when D is high and the down counter 236 has decremented to zero then AND gate 242 generates a reset signal which resets flip flop 230. Signal D is also coupled directly to NOR gate 209 so that AND gate 211 is disabled when D is high, thus, freezing the step sequence generating circuitry during the 250 millisecond delay. When the reset signal is generated from AND gate 242 resetting latch 230, D goes low, thus enabling AND gate 211 and continuing the step sequence generation.

Down counter 236 in this circuit serves several purposes. When set by signals H or F, the down counter is preset to a number equal to the number of antenna sectors, in this embodiment to the number 54. It then is decremented to zero. The output of this counter labelled "count-ant" is coupled to the control subsystem and the decrementing number is used to address the cells in the sample and hold arrays to accomplish the transfer of data in the case of transferring from ARRAY 1 to ARRAY 2 or to accomplish the zeroing in the case of zeroing ARRAY 1. When the signal G from monostable 224 is generated, it causes the down counter 236 to be preset to a number such that a 250 millisecond delay will occur before the down counter 236 reaches zero, at which time latch 230 is reset and AND gate 211 is enabled thus restarting the sequencing.

The M1 output from gate 238 will be coupled to the control input of the multiplexer 290 down in FIG. 8. Output L2 couples to the control subsystem directly to sample and hold ARRAY 2 block 276 to control the loading of sample and hold ARRAY 2. Output L6 is also coupled to the control subsystem directly to the shunt 270 shown in FIG. 8. The signal on L6 causes ARRAY 1 to be zeroed by opening shunt 270 in FIG. 8 and thus causing zero values to be read into sample and hold ARRAY 1. Output L6 is also coupled to the control signal generator where it is used to generate the signal L1 which will cause the loading of sample and hold ARRAY 1 during the zeroing mode.

The R input to the sequence generator is coupled directly to the reset input 217 of up counter 216 and the U input to the sequence generator is coupled directly to the incrementing input 219 of up counter 216. The up counter 216 holds the number which controls which scan mode the system will be in when the latch 218 is enabled. Thus, the signal on the reset input 217 will reset the counter to the beginning or scan mode while a signal on the incrementing input 219 will increment the counter to the next mode in the sequence. The output of decoder 214, step 9, is coupled directly to the enable input of latch 218. The input of latch 218 is the output of up counter 216. Thus when a signal occurs on step 9, latch 218 is enabled and the mode number stored in counter 216 is loaded into latch 218. This number is then coupled directly to decoder 220 which generates a signal on one of its five outputs establishing which of the five modes the system is in.

The outputs step 1 through 9 are coupled directly to the control signal generator 200. In addition, since the signal, step 9, is a common reset pulse, it is also coupled directly to the control subsystem 204. The five outputs of decoder 220, which are SCAN (for scan mode), MALL (for measure all mode), MEAS7 (for measure seven mode), PLC (for PL check mode), and LIST (for listen mode), are directly coupled to the control signal generator while the SCAN output is also coupled directly to the control subsystem 204.

Figure 7:
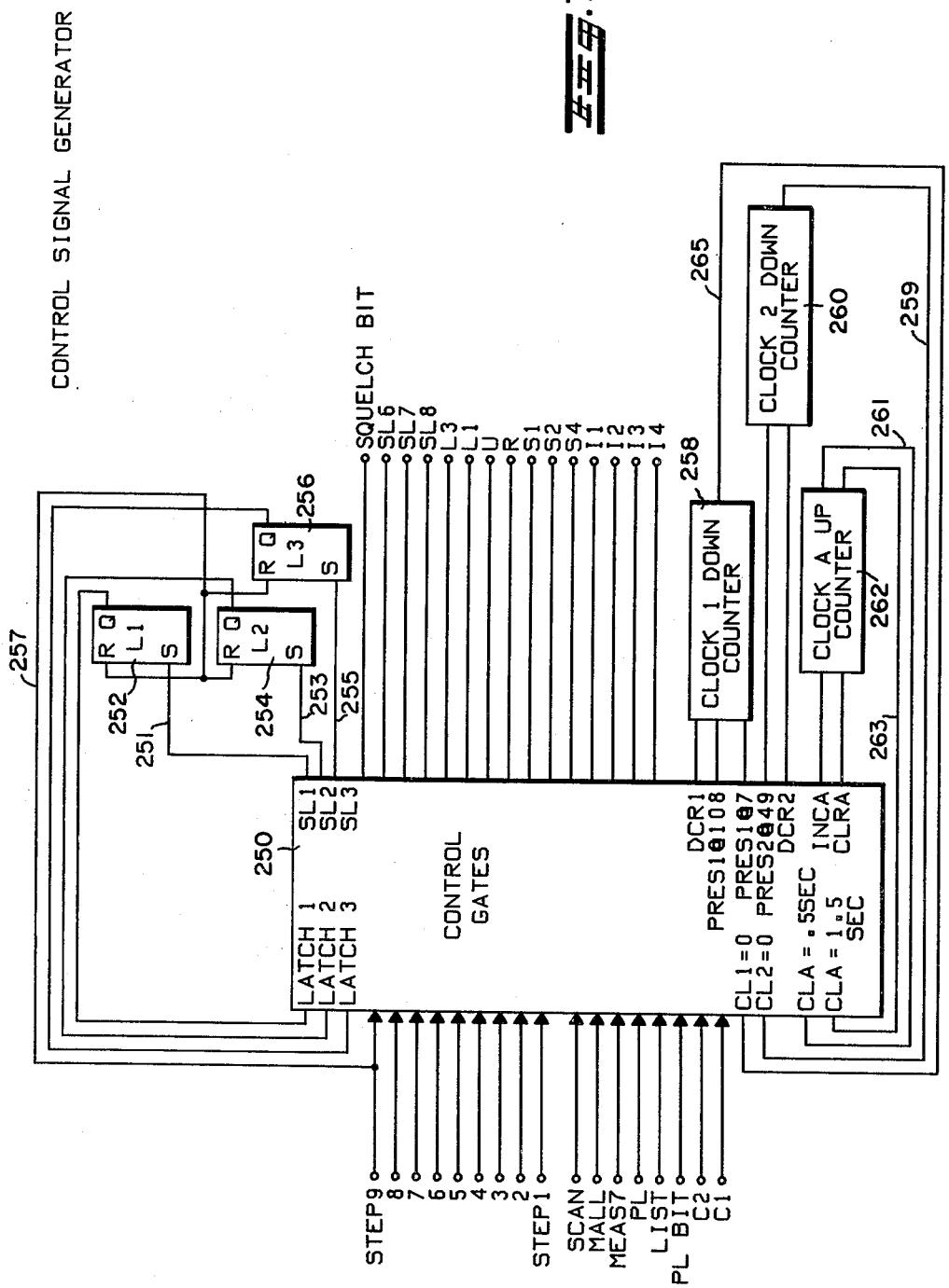
FIG. 7 is a detailed circuit diagram of the control signal generator of the scan control logic.
Figure 7A:
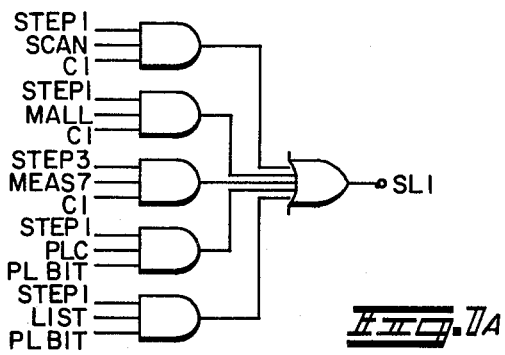
FIGS. 7A through 7Y are detailed circuit diagrams of the control gate circuitry shown in FIG. 7.
Figure 7B:
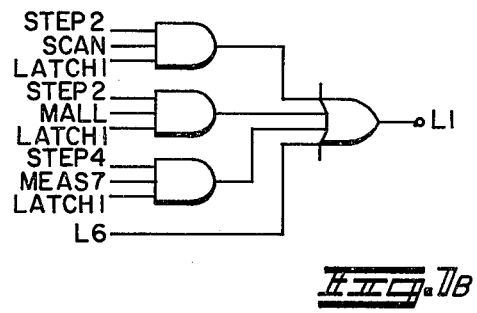
Figure 7C:
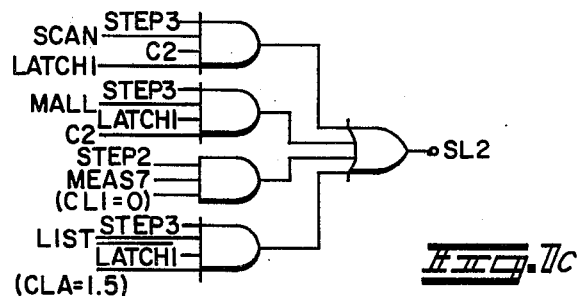
Figure 7D:
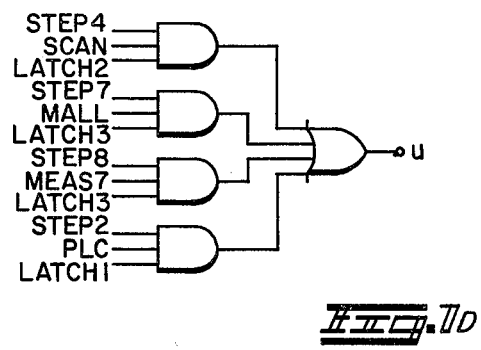
Figure 7E:
Figure 7F:
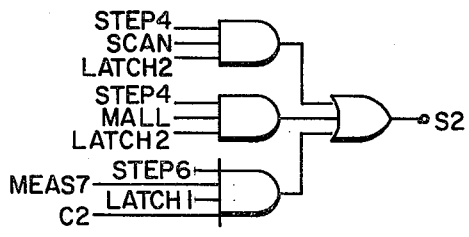
Figure 7G:
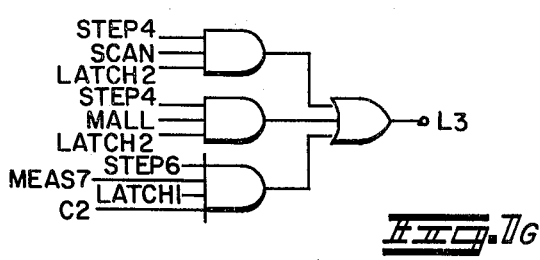
Figure 7H:
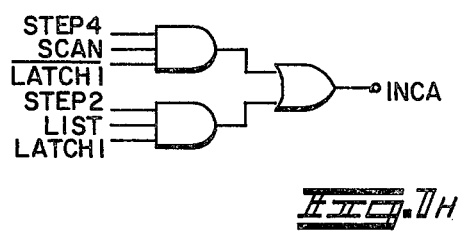

FIG. 7 shows a diagram of the control signal generator 200. The control gates block 250 is made up to a combination of commonly available gates which are connected as shown in FIGS. 7A through 7Y, according to techniques widely known in the art, based on the following Boolean expressions. The logic gate circuit implementation of each of the equations 1 through 25, shown below are illustrated respectively, in FIGS. 7A through 7Y.

| | | |
|---|---|---|
| SL1 = | (STEP 1 . SCAN . CI) + (STEP 1 . MALL . CI) + (STEP 3 . MEAS7 . CI) + (STEP 1 . PLC . PLBIT) (STEP 1 . LIST . PLBIT) | (1) |
| L1 = | (STEP 2 . SCAN . LATCH 1) + (STEP 2 . MALL . LATCH 1) + (L6) + (STEP 4 . MEAS7 . LATCH1) | (2) |
| SL2 = | (STEP 3 . SCAN . C2 . LATCH 1) + (STEP 3 . MALL . LATCH 1 . C2) + (STEP 2 . MEAS7 . (CLI = 0)) (STEP 3 . LIST . $\overline{\text{LATCH 1}}$ . (CLA = 1.5)) | (3) |
| U = | (STEP 4 . SCAN . LATCH 2) + (STEP 7 . MALL . LATCH 3) + (STEP 8 . MEAS7 . LATCH 3) + (STEP 2 . PLC . LATCH 1) | (4) |
| PRES@108 = | (STEP 4 . SCAN . LATCH 2) | (5) |
| S2 = | (STEP 4 . SCAN . LATCH 2) + (STEP 4 . MALL . LATCH 2) + (STEP 6 . MEAS7 . LATCH 1 . C2) | |

-continued

| | | |
|---|---|---|
| L3 = | (STEP 4 . SCAN . LATCH 2) + (STEP 4 . MALL . LATCH 2) + (STEP 6 . MEAS7 . LATCH 1 . C2) | (6) |
| INCA = | (STEP 4 . SCAN . $\overline{\text{LATCH 1}}$) + (STEP 2 . LIST . LATCH 1) | (7) |
| SL8 = | ((CLA = .5) . STEP 5 . SCAN . $\overline{\text{LATCH 2}}$) + | (8) |
| S1 = | (STEP 8 . SCAN) + (STEP 8 . MALL . $\overline{\text{LATCH 3}}$) + (STEP 8 . MEAS7) + (STEP 7 . MALL . LATCH 3) + STEP 2 . MEAS7 . (CL1 = 0)) | (9) (10) |
| DCR1 = | (STEP 5 . MALL + (STEP 1 . MEAS7) | (11) |
| SL3 = | (STEP 6 . (CL=0) . MALL) + (STEP 7 . MEAS7 . (CL2=0)) | (12) |
| PRES@7 = | (STEP 7 . MALL . LATCH 3) + (STEP 3 . MEAS7 . LATCH 2) | (13) |
| PRES2@49 = | STEP 7 . MALL . LATCH 3 | (14) |
| I1 = | (STEP 8 . SCAN + (STEP 8 . MALL . $\overline{\text{LATCH 3}}$) + (STEP 8 . MEAS7 . $\overline{\text{LATCH 3}}$ . $\overline{\text{LATCH 2}}$) | (15) |
| S4 = | (STEP 7 . MALL . LATCH 3) | (16) |
| I3 = | (STEP 7 . MALL . LATCH 3) | (17) |
| CLRA = | (STEP 8 . MEAS7 . LATCH 3) + (STEP 2 . PLC . LATCH 1) + (STEP 2 . LIST . LATCH 1) + (STEP 4 . LIST . LATCH 2) | (18) |
| I4 = | (STEP 8 . MEAS7 . $\overline{\text{LATCH 3}}$ . LATCH 2) | (19) |
| I2 = | (STEP 8 . MEAS7 . LATCH 3) | (20) |
| R = | (STEP 2 . PLC . $\overline{\text{LATCH 1}}$) + (STEP 4 . LIST . LATCH 2) | (21) |
| SL6 = | STEP 4 . LIST . LATCH 2 | (22) |
| DCR2 = | (STEP 6 . MEAS7) | (23) |
| SQUELCH BIT = | SCAN + MALL + MEAS7 | (24) |
| SL7 = | (STEP 8 . MEAS7 . LATCH 3) | (25) |

Clock 1 indicated at 258 in FIG. 7 is a down counter with a decrementing input and two presetting inputs. PRES1@108 is an output from the control gate circuitry which presets clock 1 to 108 at the end of the scan mode when the system is about to begin the measure all mode. Thus, clock 1 will be decremented through two complete scans of the 54 sector antenna at which point it will generate a pulse which is coupled via line 265 to the CL1=0 input of block 250. The signal on the CL1=0 input will trigger the system into the MEAS7 mode. During the MEAS7 mode the clock 1 down counter will be preset to 7 by the PRES1@7 input. Pulses on the DCR1 line will cause clock 1 to count down from its preset value to zero. Also during the MEAS7 mode, the PRES2@49 input to the clock 2 down counter 260 will preset clock 2 to 49. The DCR2 output coupled to clock 2 will cause clock 2 to count down from the preset 49 value to zero. This will result in scanning of 7 selected sectors seven times during the MEAS7 mode.

The clock A up-counter 262 is used as a timing counter and is incremented by signals on the INCA line and is cleared by signals on the CLRA line. When clock A has been incremented up to a value indicative of a time equal to 0.5 seconds, an output signal is coupled via line 261 to the input to control gate block 250 which is labelled CLA=0.5 sec. This signal indicates that during the SCAN mode no usable signal has been detected for 0.5 sec. and thus triggers the updating of the reference values in ARRAY 2 by transferring the values in ARRAY 1 to ARRAY 2. If clock A is incremented during the LIST mode to a value indicative of a time equal to 1.5 seconds, a signal is coupled via line 263 to the control gate input labelled CLA=1.5 sec. During the LIST mode this signal will indicate that a usable signal has not been detected for 1.5 seconds and therefore trigger the system back into the SCAN mode.

The latches L1 at 252, L2 at 254 and L3 at 256 are temporary storage devices which are necessary for the proper sequencing of the control signals output from the control gates of block 250. Output SL1 of block 250 is coupled directly to the set input of latch 252 via line 251, the SL2 output is coupled directly to the set input of latch 254 via line 253 and the SL3 output is coupled directly to the set input of latch 256 via line 255. All three latches L1, L2 and L3 are reset by a pulse on the step 9 input coupled to the reset inputs of the latches via line 257. These latches temporarily hold the results of previous logic decisions.

Latch 252 is set during the SCAN, MALL, and MEAS7 modes whenever a signal has occurred on the C1 input. Latch 254 will be set during the SCAN and MALL modes whenever a signal has occured on the C2 input, and whenever clock 1 has counted down to zero during the MEAS7 mode. Latch 256 will be set during the MALL mode when clock 1 has counted down to zero and during the MEAS7 mode when clock 2 has counted down to zero. During the LIST and PLC mode latch 252 is set when a signal is present on the PL bit input. Latch 254 is set during the LIST mode when clock A has generated an input signal on the CLA = 1.5 sec. input and is not used during the PLC mode while latch 256 is not set during either the PLC or the LIST mode.

The inputs to the control signal generator include the sequence steps 1 through 9 and the five inputs controlling the mode in which the system is operating. In addition, the PL bit which indicates the receiver has detected the coded squelch signal is input, along with the C1 signal which is generated when the signal received on an antenna sector is greater than the previously stored signal. Finally, the input C2 is generated when a new $\Delta V$ (i.e. the difference between the ARRAY 1 value and the ARRAY 2 value for a given sector) is found to be greater than the previous highest $\Delta V$ or during the SCAN mode, when the new $\Delta V$ exceeds the stored reference Delta.

The outputs from the control signal generator include the SQUELCH bit which is output on line 90d, shown in FIG. 5 which will in turn be coupled to the receiver squelch input. The outputs SL6, SL7 and SL8 are coupled to the sequence generator to set latches 228, 230 and 232 of FIG. 6 as described above. Output L3 is coupled to the control subsystem where it controls the loading of the TEMP 1 sample and hold memory cell labelled 282 in FIG. 8. L1 is coupled to the control subsystem and controls the loading of sample and hold ARRAY 1. Outputs U and R are coupled to the sequence generator and are the reset and increment inputs respectively of the up counter 216 shown in FIG. 6. Outputs S1, S2, S4, I1, I2, I3 and I4 are all coupled directly to the control subsystem where they are used to control the latches and multiplexer which determine the antenna number.

FIG. 8 is a detailed diagram of the control subsystem 204 of FIG. 5. The circuitry indicated in general at 305 performs the function of determining the antenna number which is used to address the storage ARRAYs 1 and 2 and the antenna switch. Negartive edge triggered latch 300 of section 305 is used to store the present antenna number. The negative edge of a pulse on S1 will cause the number applied from bus 303 of multiplexer 304 to be stored in latch 300 and applied to bus 301. Bus 301 is connected directly to latch 292, latch 296, and adder circuitry 294. Adder circuitry 294 will add on to the antenna number applied to its input by bus 301 or reset it to zero when the antenna number has reached the maximum number (the 54 antenna sectors are numbered zero through 53) outputting the result on bus 293. Thus, adder circuitry 294 generates the antenna number for the next antenna sector and applies it via bus 293 to the number 1 input of multiplexer 304. The antenna number stored in latch 300 is also applied via bus 301 to latch 296 which is used to store the antenna number of the sector with the highest signal level. This is accomplished by a signal on S2 which will cause latch 296 to store the number applied to its input at the time that the signal on S2 occurs and the signal on S2 is generated when the maximum signal is detected. The antenna number stored in latch 296 will be then applied to the input of subtraction circuitry 298 and to the number 2 input to multiplexer 304 via bus 297. Subtraction circuitry 298 will subtract 3 from the antenna number stored in latch 296 and apply the result to bus 299. This antenna number will be used during the MEAS7 mode to scan the three sectors on either side of the sector which has had the highest detected signal. Bus 299 will then apply this number to the number 3 input of multiplexer 304 as well as to the input of latch 302. Latch 302 will store the antenna number applied to its input by bus 299 when a signal is applied on line S4 resulting in this number being applied to input number 4 of multiplexer 304.

The control signals on I1 through I4 will select which of the four antenna number inputs will be output on bus 303 by multiplexer 304. Thus a signal on I1 will cause the antenna number on bus 293 at input number 1 to be coupled to latch 300 via bus 303 by multiplexer 304. A signal on I2 will cause the antenna number at input number 2 to be passed to bus 303, a signal on I3 will cause the antenna number on input 3 to be passed to the output bus 303 and a signal on I4 will cause the antenna number on input 4 to be passed to bus 303 by the multiplexer 304. Thus, by the appropriate signals on I1 through I4, generated during any given mode, the appropriate antenna number will be output from multiplexer 304, and then stored in latch 300 when the negative edge pulse occurs in the S1 input.

The selected antenna number is then applied to latch 292 via bus 301 and will be stored when the pulse occurs on the step 9 input to latch 292. The latch 292 is necessary so that the antenna number on bus 301 is not applied to multiplexer 290 until the circuitry of section 305 has determined the number. Once latch 292 has been set by the input step 9, the antenna number is applied to multiplexer 290 via bus 291. Multiplexer 290 will apply the antenna number on bus 291 to bus 289 except when a signal on input M1 causes the multiplexer to apply the antenna number on bus 287 which is the count antenna output coupled from the sequence generator. Bus 289 will apply the antenna number directly to sample and hold ARRAY 1 at 272 and sample and hold ARRAY 2 at 276, as well as to the antenna number output 90c which is coupled to the antenna switch. Thus, when ARRAY 1 is being zeroed or when a transfer of data from ARRAY 1 to ARRAY 2 is to occur, the signal on M1 will cause the memory cells of the sample and hold arrays to be addressed by the count on the COUNT-ANT bus 287. At all other times multiplexer 290 will apply the antenna number determined by section 305 to bus 289.

A signal representative of the signal strength from the receiver is generated on output 80a of signal strength detector 80 and coupled directly to shunt 270 at input 90a. The output of 270 is coupled directly to sample and hold ARRAY 1 and comparator 278. A signal on the L6 input to shunt 270 will cause zero equivalent values to be coupled to ARRAY 1 at 272. Otherwise, shunt 270 couples the signal directly from input 90A to input 272a of ARRAY 1. The values stored in the memory cell addressed by the number on input 272b of ARRAY 1 will be output on line 273 and coupled directly to non-linear transfer circuit 274. The output from circuit 274 is coupled directly into the input 276a of sample and hold ARRAY 2. The values stored in the memory cell addressed by the number on input 276b of ARRAY 2 will be applied to the output on line 277.

When a signal is applied to the L1 input of ARRAY 1, the value appearing at the input 272a will be stored in the memory cell addressed by the number on input 272b. A signal on the L2 input of ARRAY 2 will result in storing the value appearing at 276a in memory cell addressed by the number on input 276b. Thus, a signal on L2 will result in storing the value in the addressed cell of ARRAY 1 into the same numbered memory cell of ARRAY 2.

In addition, the signal appearing at the output of ARRAY 1 on line 273 is applied to line 279 and coupled directly to the input of comparator 278. Thus, the value from the antenna sector coming in to comparator 278 on line 271 will be compared to the value already stored in ARRAY 1 in the corresponding memory cell. A signal will be output from comparator 278 on output C1 when the incoming signal from the antenna sector is greater than or equal to the value already stored in the corresponding memory cell of ARRAY 1.

The output of sample and hold ARRAY 1 on line 273 is also applied via line 279 to the input of subtractor 280. The second input of subtractor 280 is the value from ARRAY 2 supplied via line 277. The output of subtractor 280 on line 281 is the difference between the values stored in ARRAY 1 and the values stored in ARRAY 2, referred to as $\Delta V$. This $\Delta V$ is applied directly to the input of temporary sample and hold storage cell 282 and to the input of comparator 288. The signal on the L3 input of temporary sample and hold storage cell 282 will cause the value applied to its input on line 281 to be loaded in and thus stored in temporary storage cell 282. The value in sample and hold storage cell 282 is output onto line 283 and coupled directly to switch 284. A fixed $\Delta V$ reference value is permanently stored in cell 286 which is coupled directly into switch 284. Thus, when the scan input to switch 284 is low, the switch connects the second input of comparator 288 directly to the output of the temporary sample and hold cell 282. When the value of the scan input is high, switch 284 will couple the output of the fixed reference 286 directly to the second input of comparator 288. This allows the $\Delta V$ from subtractor 280 to be compared to either a fixed reference 286 or a temporary reference 282. The result is an output from comparator 288 on line C2 when the new $\Delta V$ from 280 is greater than or equal to the corresponding $\Delta V$ applied through switch 284.

The above described circuitry is a discrete embodiment of the invention. However, by programming a microcomputer system to perform most of the scan control logic functions a less expensive and preferred embodiment of the invention can be implemented.

FIG. 10 illustrates the preferred embodiment of scan control logic wherein said logic is realized via a standard microprocessor. The microcomputer system shown in FIG. 10 is the commercially available Intel MCS-8C microcomputer design kit with Intel integrated circuit part numbers indicated. The output 80a from the signal strength detector 80 feeds to the analog to digital converter 790 which in turn converts the analog signal strength input levels to corresponding digital levels, which are then coupled via bus 800 to a peripheral interface circuit 810. Also feeding to the peripheral interface circuit 810 is the coded signal (PL bit) output 70d from the receiver. The peripheral interface couples this data via a bus 820 to the processor bus 830. Also coupled to the processor bus 830 is a read only memory (ROM) 850, in which the program is stored and a random access memory (RAM) 840 in which the Array data is stored. The central processing unit 860 is also coupled to the processor bus 830 and is controlled in the normal manner via a controller 870 and crystal controlled clock generator 880. Under program control the central processing unit 860 processes the data transmitted to the processor bus 830 and generates the required control signals. In response to the control signals on the processor bus 830, the peripheral interface circuit 810 provides signals on an output line 810a which are adapted to control the antenna switch.

FIG. 9A is a general program flow diagram for the microprocessor of FIG. 10 to implement the present invention as shown in FIG. 10. A reset block 500 is loadable from the front panel and triggers initial operation of the processor sequence. Additionally, the reset block 500 may interrupt system operation. The output from the reset block 500 is fed to an initial block 510 which performs standard microprocessor functions such as zeroing out all the arrays and initialling all counters. The initial block in turn activates the START block 520. Every one millisecond the computer goes through the start block to determine which of the modes the sequence is in. From the start block the computer can either go through the scan (SCAN) block 530, the Measure All (MALL) block 540, the select Measure seven (MEAS7) block 550, the coded signal check (PLC) block 560 or the listen (LIST) block 570. Following the sequence dictated by the particular block 530–570 the system enters a delay block 580. Since some of the functions 530–570 require less operation time than others, the delay block 580 provides an appropriate time delay such that restart control is fed to the START block 520 at precise intervals.

FIG. 9B is a more detailed flow diagram of START block 520 of FIG. 9A. The START routine is entered at block 600 from the initial block 510 when the program is initially started and is subsequently entered from the DELAY block 580 every one millisecond. At block 602 the START routine obtains the value of STATUS which will determine which mode the program is in. At block 604 the program will determine the routine address of the appropriate scan mode based on the value of STATUS. The START routine will then set up the pointer TEMPA and TEMPB as indicated at block 606. TEMPA is a memory location in ARRAY 1 and TEMPB is a memory location in ARRAY 2, corresponding to the antenna sector ANT which will be sampled at the next block 608. The START routine then takes a reading of the input signal strength on antenna sector ANT and stores it as temporary data labelled "DATAT" as indicated in block 608. The START routine then jumps to one of the five mode routines (SCAN, MALL, MEAS7, PLC, LIST) determined by the routine address from block 604.

FIG. 9C is a more detailed flow diagram of the SCAN routine 530. The SCAN routine will be entered from the start routine at block 620 and initially determines a value for TANT as shown in block 622 indicated as the function $MOD_N(\ )$. TANT is the next antenna number. $MOD_N(\ )$ determines TANT to be the antenna number plus one except when TANT reaches the maximum antenna number (52 in the preferred embodiment), then TANT will be reset to 0. The value of TANT is then output and program flow continues to block 624. At this block the program determines whether the reading from the antenna DATAT is greater than the value at the location TEMPA in ARRAY 1. If it is, then that data value is stored in the location in TEMPA of ARRAY 1, as indicated in block 636. Once the data transfer has occurred, then at block 638 the program determines whether the difference between the value in ARRAY 1 and the value stored in ARRAY 2 is greater than a fixed reference called DELTA. If it is, program flow continues to block 640 where the difference between the value at TEMPA and the value at TEMPB is stored in location TEMP1. Then the program stores the corresponding antenna number in location TEMP2 as indicated in block 642 and will set the counter CL1 equal to 108 as indicated in block 644. These values will be used at a later point in the program. In block 646 the value of STATUS is set to equal MALL so that when the program goes around the loop through the START routine, the start routine will direct program flow to the measure all (MALL) routine indicated in FIG. 9a as block 540. At block 648 COUNT will be set to establish the proper amount of delay so that total time around the loop is one millisecond and program flow will be transferred to WAITA which is indicated in FIG. 9a as DELAY block 580.

If, however, the result of the decisions of block 624 or 638 is no, then program flow proceeds to block 626. At this point in the program, the clock counter, CLA is incremented and program flow continues to block 628. At block 628 it is determined whether CLA has reached a value equivalent to approximately 0.5 sec. If the result is yes, this means that no signal has been detected for more than a predetermined period (512 milliseconds in the preferred embodiment) and therefore the values in ARRAY 1 are transferred to ARRAY 2 to update the reference levels in ARRAY 2. This is shown as subroutine TRANS at block 632 and described in more detail below. If the result is no, program proceeds to block 630 which sets the appropriate value for COUNT to establish the necessary delay after which control returns to the START block and the sequence repeats.

If the value of STATUS has been set during the scan routine to MALL, then on the next loop the start routine will direct program control to the measure all routine indicated as MALL at block 540 in FIG. 9A. FIG. 9D is a more detailed flow diagram of the MALL routine which is entered at block 650. At block 652 the program determines the next antenna number TANT and outputs TANT. The routine will then call the subroutine DELC indicated at block 654. This subroutine will determine if the reading from the present antenna sector currently has the largest $\Delta V$ and if it does, the subroutine will store that value and update the value of TEMP1 to store the antenna sector that it was measured on. A flow diagram for this subroutine is shown in FIG. 9J. After program control returns from subroutine DELC, program flow continues to block 656 where counter CL1 is decremented. CL1 was set to 108 in the scan routine in order to allow the measure all routine to scan all 54 sectors two times. In block 658 it is determined whether counter CL1 is equal to zero or not. If it is not, then program flow continues to block 660 where an appropriate value of COUNT is set to establish the necessary delay after which the program will return to the START routine.

However, if CL1 is zero, this means that all 54 sectors have been scanned twice and therefore program control will proceed to block 662. In block 662 the STATUS will be set to MEAS7 so that on the next loop program control will be transferred to the MEAS7 routine indicated in FIG. 9A as block 550. In addition, CL1 will be set to 7 and CL2 to 49 to establish the values to control the number of loops through the MEAS7 routine. Then, as shown at block 664, the antenna number ANT is set equal to the sector number with the highest reading minus 3 (i.e. TEMP2 minus 3). This is then set equal to the variable SANT. The purpose of this is to establish the beginning sector number to permit scanning of three sectors on each side of that sector with the highest reading. Program flow then proceeds to block 666 at which the new antenna number calculated in block 664 is output. Then, the necessary COUNT is established to provide the required delay in the DELAY routine after which program control returns to the START routine.

The subroutine DELC referred to in block 654 of FIG. 9D is shown in greater detail in FIG. 9J. The subroutine is entered at block 770 and program control proceeds to block 772. At this point the subroutine determines whether the present data reading DATAT is greater than or equal to the value in ARRAY 1 at TEMPA. If it is, then program control proceeds to block 776 to replace the existing value of ARRAY 1 at TEMPA with the value of DATAT. Otherwise, the subroutine returns to the original program. Then at block 778 subroutine determines if the value of ARRAY 1 at TEMPA minus the value of ARRAY 2 at TEMPB is greater than or equal to the existing value of TEMP1. If no, then subroutine control returns to the original program, if yes, then the new $\Delta V$ (which is the value of ARRAY 1 at TEMPB minus the value of ARRAY 2 at TEMPB) is set equal to TEMP1 and at 784 the antenna number ANT is temporarily stored as TEMP2 antenna number. After which control returns to the original point in the program as indicated at block 786.

After the STATUS variable is set to MEAS7 in the MALL routine as indicated at block 662 in FIG. 9D, then the next time the program loops to the START routine, the START routine will direct program flow to the MEAS7 routine indicated in FIG. 9A as block 550. The MEAS7 routine is indicated in more detail in FIG. 9E. This routine is entered at block 670, after which CL1 is immediately decremented as indicated at block 672. Then the routine checks for CL1 equal to zero as indicated at block 674. If it is not, this indicates that the full 7 sectors have not been scanned and the program continues to block 676 where a new antenna number (TANT) is determined and then that new antenna number is output as indicated at block 682.

If, however, CL1 is equal to zero, then as indicated at block 678, CL1 will be set back to 7 and then at block 680 the new antenna number will be set to the beginning number for the seven sector section which has been stored as SANT in the MALL routine. Once the new TANT has been stored as indicated at block 680, it is then output as indicated at block 682 and program control proceeds to block 684 to call the subroutine DELC. After program control is returned from the subroutine DELC the variable CL2 is decremented as indicated at block 686. Then at block 688 the program checks to see if CL2 (which was set to 49 in the MALL routine) is equal to 0. If it is not, this means that the measure 7 routine has not scanned the seven sectors seven times and it proceeds to block 690, where the appropriate COUNT value is set to establish the necessary waiting period and the DELAY routine is entered at WAITA. If CL2 is equal to zero, then control proceeds to block 692 because the MEAS7 routine has now scanned the seven sectors seven times. At block 692, the program sets STATUS to PLC, clears CLA to zero and sets the antenna number equal to TEMP2. The program then outputs the antenna number for the purpose of doing the PL check as indicated at 694. At this point sufficient time (250 milliseconds in the preferred embodiment) must be allowed for detection of the PL code. Therefore, after the antenna number has been output, an appropriate COUNT value is set at block 696 and the DELAY routine is entered at WAIT to establish the necessary 250 ms period before return to the START routine.

Once the MEAS7 routine has set the STATUS variable to PLC the start routine on the next loop will transfer program control to the PLC routine indicated at block 560 in FIG. 9A. The PLC routine is indicated in greater detail in FIG. 9F. The PLC routine is entered at block 700 and the routine immediately determines whether the PL bit is true or not. If the PL bit is true, this indicates that the coded squelch signal has been detected and the program immediately sets STATUS to LIST as indicated at block 704. Program flow then proceeds to block 706 where the appropriate COUNT value is set to establish the necessary delay and control will then be returned to start routine which will then transfer program control to the LIST routine indicated in FIG. 9A as block 570.

If the PL bit is not true, this indicates that the code squelch signal has not been detected and program control proceeds to block 708. At this point the routine sets STATUS to SCAN and CLA to zero. This means that on the next pass to the start routine, the program will return to the SCAN mode. Following block 708 the values in ARRAY 1 are transferred to ARRAY 2 by means of the transfer subroutine as indicated at block 710, after which control is returned directly to the start routine as indicated at block 712. It should be emphasized that a situation in which the PL bit is not true is indicative of a non-authorized user situation. The transfer which occurs at block 710 is done so as to permit the system to ignore the signals of a nonauthorized user.

After the PLC routine has determined that the coded squelch signal has been detected and thus has set STATUS to LIST, the start routine will on the next loop transfer control to the listen routine indicated in FIG. 9A as Block 570. During the listen mode no further scanning occurs, instead the one antenna sector which has been determined to have the highest signal level remains connected for the duration of the message.

A detailed flow diagram of the LIST routine is shown in FIG. 9G which indicates that the routine is entered at block 720. Program control proceeds immediately to block 722 which determines whether the PL bit is still true. If it is true, then CLA is set to zero, and an appropriate COUNT value is set to establish the necessary waiting period before returning to the START routine. Meanwhile, the receiver remains connected to the selected antenna sector. If the PL bit is not true, the program control proceeds to block 728 which increments CLA. At block 730 the variable CLA is then check to determine if it corresponds to a predetermined time period, which is set at 1.5 seconds for this embodiment. This time period is established since a loss of the PL bit for a short period of time would not necessarily indicate the end of a message. Therefore, the system will wait 1.5 seconds before determining that the message is ended and thus starting the SCAN routine over again. If CLA indicates less than 1.5 seconds then program control will proceed to block 732 where an appropriate COUNT value will be set to establish necessary waiting period before returning control to the start routine for another loop through the LIST routine. If the CLA variable indicates a time period of 1.5 seconds, then program control proceeds to block 734 which will set STATUS to SCAN, clear the CLA variable to 0 and clear the contents of ARRAY 1 to 0. This will result in beginning the entire scanning sequence over again. Program control will then proceed to block 736 where the latest antenna number is output. Following the output of the antenna number in block 736 a COUNT value will be set and program will be transferred to the DELAY routine at the WAIT entry point as indicated at block 738.

The detailed flow diagram for the transfer (TRANS) routine is shown in FIG. 9H. This routine is entered at block 740. Program proceeds immediately to block 742 where the transfer of data from ARRAY 1 into ARRAY 2 occurs. This transfer may be linear, or, as in the preferred embodiment, the program may be written to perform a nonlinear transfer of the data. After the transfer occurs, the CLA variable is set to zero as in block 744 and the subroutine then returns to the program from which is was called as indicated at block 746.

The nonlinear transfer can be performed, as in the preferred embodiment, by using a table of values such that a predetermined value from the table is substituted for a given value in ARRAY 1 and this substitute value is the value which is transferred to ARRAY 2. The transfer function used in the preferred embodiment is substantially a logrithmic function, although this is not the only function that can be used. This change in value will allow a fixed difference between the reference and the signal to have different effects depending upon the absolute signal strength. In the preferred embodiment the stronger signals are increased. Thus, it is possible to allow a weak signal to be accepted over noise much more readily than a strong signal that is accompanied by co-channel interference. This is necessary because co-channel interference interferes with the understandability of the desirable communications much more than random noise.

The DELAY routine indicated in FIG. 9A as block 580 is shown in greater detail in FIG. 9I. This routine can be entered at two points indicated at block 750 as WAITA and at block 756 labelled WAIT. Upon entry at block 750, the program immediately progresses to block 752 where the antenna number is updated to equal TANT which was previously the next antenna number. Block 754 decrements the COUNT which is set in the last step before calling the DELAY routine. This block can also be entered through the entry point indicated at block 756. The block 754 and 758 make up the delay loop which will establish the proper amount of delay for each routine based on the COUNT value which was set prior to calling the delay routine. Once COUNT has been decremented all the way to zero, then the routine will return program control to the start routine as indicated in block 760.

In summary, an improved sectored antenna receiving system has been described, which system is particularly useful for applications such as the land mobile type.

While preferred embodiments of the invention have been described in detail, it should be apparent that many modifications and variations thereto are possible, all of which fall within the true spirit and scope of the invention.

Further, due to the flexible nature of the instant invention, it is contemplated that two or more antenna arrays may be combined in any one of several well known diversity systems.

APPENDIX

Following is an assembly language program listing, using the 8080 macro assembler, of the procedure defined in FIGS. 9A through 9J and based on the 8080 assembly language programming manual. Accordingly, the variable names referred to in FIGS. 9A through 9J are used in the program listing and the blocks in FIG. 9A are indicated in the listing.

```
                                            Program Listing
8080 MACRO ASSEMBLER, VER1 1.0
        ; ASSEMBLER VALUES
        BLK         EQU         3C3OH
        CRLF        EQU         3CADH
        DELTA       EQU         5H
        K1          EQU         92
        K2          EQU         OH
        K3          EQU         91
        K4          EQU         89
        K5          EQU         80
        K6          EQU         86
        K7          EQU         OBO85H
        K8          EQU         100
        K9          EQU         110
        K10         EQU         109
        K11         EQU         107
        K12         EQU         133
        LBYTE       EQU         3DBOH
        LISTS       EQU         8H
        MALLS       EQU         2H
        MEA7S       EQU         4H
        MEMTOP      EQU         1400H
        NIBBLE      EQU         3E00H
        PLB         EQU         80H
        PLS         EQU         6H
        SCANB       EQU         80H
        SCANS       EQU         OH
        TI          EQU         3F6DH
        ;
        ; PORT NUMBERS
        ; DATA       EQU         OF5H
        PORT        EQU         OF4H
        ; MEMORY
        ;
                    ORG         1260H
        ARR1:       DS          40H
        ARR2:       DS          40H
        ANT:        DB          OH
        STATUS:     DB          OH
        CL1:        DB          OH
        CL2         DB          OH
        CLA:        DW          OOH
        DATAT:      DB          OH
        SANT:       DB          OH
        TANT:       DB          OH
        TEMP1:      DB          OH
        TEMP2:      DB          OH
        TEMPA:      DW          11H
        TEMPB:      DW          11H
        ;
        ; PROGRAM
        ;
                    ORG         8H
        INITIAL     LXI         H,0H
                    SHLD        CLA
                    MVI         A,54
                    LXI         H,ARR1
        I1:         MVI         M,0H
                    INX         H
                    DCR         A
                    JNZ         I1
                    LXI         H, STATUS
                    MVI         M,SCANS
                                            ;STATUS=SCAN1
                    DCX         H
                    MVI         H,0H        ;ANT=-0
                    LXI         SP,MEMTOP   ;SET UP SP
```

|  |  |  |  |
|---|---|---|---|
|  | LXI | H, START |  |
|  | PUSH | H |  |
|  | MVI | A, 83H |  |
|  | OUT | 17H |  |
|  | MVI | A,0H |  |
|  | ORI | SCANB |  |
|  | CALL | OUTP |  |
| I2: | LXI | H,ARR2 | ;POINTER |
|  | MVI | A,54 | ;COUNTER |
| I3: | MVI | M,3FH |  |
|  | INX | H |  |
|  | DCR | A | ;CONTROL |
|  | JNZ | I3 |  |
|  | LXI | D,0H |  |
|  | JMP | WAIT |  |
| ;END INITITAL ROUTINE |  |  |  |
| START: | LXI | H,START |  |
|  | PUSH | H |  |
|  | LXI | H,IJMP | ;TABLE OF INDIRECT ;JPS |
|  | MVI | D,0H |  |
|  | LDA | STATUS |  |
|  | MOV | E,A |  |
|  | DAD | D | ;PICK OFF ;ROUTINE ADDRESS |
|  | MOV | C,M |  |
|  | INX | H |  |
|  | MOV | B,M |  |
|  | PUSH | B | ;SAVE ROUTINE ADDRESS |
|  | LXI | H,ARR1 |  |
|  | LDA | ANT | ;RETRIEVE ;ANT NUMBER |
|  | MOV | E,A |  |
|  | DAD | D | ;SET UP POINTER1 |
|  | SHLD | TEMPA |  |
|  | LXI | D,40H |  |
|  | DAD | D | ;POINTER 2 |
|  | SHLD | TEMPB |  |
|  | CALL | INP | ;GET DATA |
|  | STA | DATAT | ;STORE DATA |
|  | RET |  | ;JMP INDIRECT TO ;ROUTINE |
| ;END START ROUTINE |  |  |  |
| SCAN: | CALL | ANTI |  |
|  | ORI | SCANB | ;(SCANB)+MOD(ANT+1) |
|  | CALL | OUTP |  |
|  | LDA | DATAT |  |
|  | LHLD | TEMPA |  |
|  | ANI | 3FH |  |
|  | CMP | M | ;PEAK DET |
|  | JM | S2 |  |
|  | MOV | M,A |  |
|  | LHLD | TEMPB |  |
|  | SUB | M |  |
|  | CPI | DELTA | ;IS DIFF .GT. DEL V |
|  | JM | S2 | ;IF NOT |
|  | STA | TEMP1 | ;IF STORE DEL V |
|  | LDA | ANT |  |
|  | STA | TEMP2 | ;STORE ANT |
|  | MVI | A,108 |  |
|  | STA | CL1 | ;RESET CLOCK A |
|  | MVI | A,MALLS |  |
|  | STA | STATUS | ;STATUS=MALL |
|  | LXI | D,K3 | ;SET WAIT TIME |
|  | JMP | WAITA | ;INC ANT AND TIME OUT |
|  | LHLD | CLA |  |
| S2: | INX | H |  |
|  | MVI | A,2H |  |
|  | CMP | H |  |
|  | SHLD | CLA |  |
|  | JNZ | S3 |  |
|  | CALL | TRANS |  |
|  | LXI | D,K2 |  |
|  | JMP | WAITA |  |
| S3: | LXI | D,K1 |  |
|  | JMP | WAITA |  |
| ;END SCAN ROUTINE |  |  |  |
| ; |  |  |  |
| MALL: | CALL | ANTI | ;INC ANTI |
|  | ORI | SCANB | ;FORMAT |

|      |       | -continued |         |
|------|-------|------------|---------|
|      | CALL  | OUTP       | ;OUTPUT |
|      | CALL  | DELC       |         |
|      | LDA   | CL1        |         |
|      | DCR   | A          |         |
|      | STA   | CL1        |         |
|      | JZ    | MA1        |         |
|      | LXI   | D,K4       |         |
|      | JMP   | WAITA      |         |
| MA1: | MVI   | A,MEA7S    |         |
|      | STA   | STATUS     |         |
|      | MVI   | A,7        |         |
|      | STA   | CL1        |         |
|      | MVI   | A,49       |         |
|      | STA   | CL2        |         |
|      | LDA   | TEMP2      |         |
|      | SUI   | 3          |         |
|      | JP    | MA2        |         |
|      | ADI   | 54         |         |
| MA2: | STA   | ANT        |         |
|      | STA   | SANT       |         |
|      | ORI   | SCANB      |         |
|      | CALL  | OUTP       |         |
|      | LXI   | D,K5       |         |
|      | JMP   | WAIT       |         |
| ;END MEASURE ALL ROUTINE |||
| MEAS7: | LDA | CL1        |         |
|      | DCR   | A          |         |
|      | STA   | CL1        |         |
|      | JZ    | M1         |         |
|      | CALL  | ANTI       |         |
|      | JMP   | M2         |         |
| M1:  | MVI   | A,7H       |         |
|      | STA   | CL1        |         |
|      | LDA   | SANT       |         |
|      | STA   | TANT       |         |
| M2:  | ORI   | SCANB      |         |
|      | CALL  | OUTP       |         |
|      | CALL  | DELC       |         |
|      | LXI   | H,CL2      |         |
|      | DCR   | M          |         |
|      | JZ    | ME3        |         |
|      | LXI   | D,K6       |         |
|      | JMP   | WAITA      |         |
| ME3: | MVI   | A,PLS      |         |
|      | STA   | STATUS     |         |
|      | LXI   | H,OH       |         |
|      | SHLD  | CLA        |         |
|      | LDA   | TEMP2      |         |
|      | STA   | ANT        |         |
|      | CALL  | OUTP       |         |
|      | LXI   | D,K7       |         |
|      | JMP   | WAIT       |         |
| ;END MEASURE SEVEN ROUTINE |||
| PLC: | LDA   | DATAT      |         |
|      | ANI   | PLB        |         |
|      | JZ    | P1         |         |
|      | MVI   | A,LISTS    |         |
|      | STA   | STATUS     |         |
|      | LXI   | D,K9       |         |
|      | JMP   | WAIT       |         |
| P1:  | MVI   | A,SCANS    |         |
|      | STA   | STATUS     |         |
|      | JMP   | TRANS      |         |
| ;END PLC ROUTINE |||
| LIST: | LDA  | DATAT      |         |
|      | ANI   | PLB        |         |
|      | JZ    | L1         |         |
|      | LXI   | H,OH       |         |
|      | SHLD  | CLA        |         |
|      | LXI   | D,K10      |         |
|      | JMP   | WAIT       |         |
| L1:  | LHLD  | CLA        |         |
|      | INX   | H          |         |
|      | SHLD  | CLA        |         |
|      | MVI   | A,1H       |         |
|      | CMP   | H          |         |
|      | JZ    | L2         |         |
|      | LXI   | D,K11      |         |
|      | JMP   | WAIT       |         |
| L2:  | MVI   | A,SCANS    |         |
|      | STA   | STATUS     |         |
|      | LXI   | H,OH       |         |

|         |       | -continued |
|---------|-------|------------|
|         | SHLD  | CLA        |
|         | MVI   | A,54       |
|         | LXI   | H,ARR1     |
| L3:     | MVI   | M,OH       |
|         | INX   | H          |
|         | DCR   | A          |
|         | JNZ   | L3         |
|         | LDA   | ANT        |
|         | ORI   | SCANB      |
|         | CALL  | OUTP       |
|         | LXI   | D,K12      |
|         | JMP   | WAIT       |

;END LISTEN ROUTINE  
;REFERENCED ROUTINES  
;

|         |       |           |
|---------|-------|-----------|
| ANTI;   | LDA   | ANT       |
|         | INR   | A         |
|         | CPI   | 54        |
|         | JNZ   | A1        |
|         | XRA   | A1        |
| A1:     | STA   | TANT      |
|         | RET   |           |
| DELC:   | LDA   | DATAT     |
|         | LHLD  | TEMPA     |
|         | ANI   | 3FH       |
|         | CMP   | M         |
|         | RM    |           |
|         | MOV   | M,A       |
|         | LHLD  | TEMPB     |
|         | SUB   | M         |
|         | LXI   | H,TEMP1   |
|         | CMP   | M         |
|         | RM    |           |
|         | MOV   | M,A       |
|         | LDA   | ANT       |
|         | INX   | H         |
|         | MOV   | M,A       |
|         | RET   |           |
| INP:    |       |           |
|         | IN    | DATA      |
| INNOT:  | NOP   |           |
|         | RET   |           |
| OUTP:   |       |           |
| OUTN:   | CMA   |           |
|         | OUT   | PORT      |
|         | RET   |           |
| TRANS:  | LXI   | H,OH      |
|         | MVI   | A,54/4+1  |
|         | DAD   | SP        |
|         | SHLD  | CLA       |
|         | LXI   | H,ARR2+54 |
|         | SPHL  |           |
|         | LXI   | H,ARR1+54 |
|         | SHLD  | TEMPA     |
| T1:     | LHLD  | TEMPA     |
|         | DCX   | H         |
|         | MOV   | B,M       |
|         | MVI   | M,OH      |
|         | DCX   | H         |
|         | MOV   | C,M       |
|         | MVI   | M,OH      |
|         | DCX   | H         |
|         | MOV   | E,M       |
|         | MVI   | M,OH      |
|         | DCX   | H         |
|         | MOV   | E,M       |
|         | MVI   | M,OH      |
|         | SHLD  | TEMA      |
|         | MVI   | H,CUR/100H|
|         | MOV   | L,E       |
|         | MOV   | E,M       |
|         | MOV   | L,D       |
|         | MOV   | D,M       |
|         | MOV   | L,C       |
|         | MOV   | C,M       |
|         | MOV   | L,B       |
|         | MOV   | B,M       |
|         | PUSH  | B         |
|         | PUSH  | D         |
|         | DCR   | A         |
|         | JNZ   | T1        |
|         | LHLD  | CLA       |

|        |      | -continued      |
|--------|------|-----------------|
|        | SPHL |                 |
|        | LXI  | H,0H            |
|        | SHLD | CLA             |
|        | RET  |                 |
| WAITA: | LDA  | TANT            |
| STA    | ANT  |                 |
| WAIT:  | INR  | E               |
|        | INR  | D               |
| W1:    | DCR  | E               |
|        | JNZ  | W1              |
|        | MVI  | E,0FFH          |
|        | DCR  | D               |
|        | JNZ  | W1              |
|        | RET  |                 |
| IJMP:  | DW   | SCAN            |
|        | DW   | MALL            |
|        | DW   | MEAS7           |
|        | DW   | PL              |
|        | DW   | LIST            |
|        | ORG  | 100H*($/100H+1);|
| CUR:   | DB   | 0               |
|        | DB   | 0               |
|        | DB   | 0               |
|        | DB   | 0               |
|        | DB   | 1               |
|        | DB   | 2               |
|        | DB   | 3               |
|        | DB   | 4               |
|        | DB   | 5               |
|        | DB   | 7               |
|        | DB   | 9               |
|        | DB   | 10              |
|        | DB   | 12              |
|        | DB   | 13              |
|        | DB   | 14              |
|        | DB   | 15              |
|        | DB   | 16              |
|        | DB   | 17              |
|        | DB   | 17              |
|        | DB   | 20              |
|        | DB   | 22              |
|        | DB   | 24              |
|        | DB   | 26              |
|        | DB   | 28              |
|        | DB   | 30              |
|        | DB   | 32              |
|        | DB   | 33              |
|        | DB   | 35              |
|        | DB   | 37              |
|        | DB   | 38              |
|        | DB   | 39              |
|        | DB   | 40              |
|        | DB   | 40              |
|        | DB   | 41              |
|        | DB   | 42              |
|        | DB   | 43              |
|        | DB   | 44              |
|        | DB   | 45              |
|        | DB   | 46              |
|        | DB   | 47              |
|        | DB   | 48              |
|        | DB   | 49              |
|        | DB   | 50              |
|        | DB   | 50              |
|        | DB   | 51              |
|        | DB   | 52              |
|        | DB   | 52              |
|        | DB   | 53              |
|        | DB   | 54              |
|        | DB   | 54              |
|        | DB   | 55              |
|        | DB   | 56              |
|        | DB   | 56              |
|        | DB   | 57              |
|        | DB   | 57              |
|        | DB   | 58              |
|        | DB   | 58              |
|        | DB   | 59              |
|        | DB   | 63              |
|        | DB   | 63              |
|        | DB   | 63              |
|        | DB   | 63              |

| | |
|---|---|
| -continued | |
| DB | 63 |
| DB | 63 |
| END | |

What is claimed is:

1. A radio frequency communication system, comprising:
   (a) sectored antenna array means having a plurality of antenna sectors;
   (b) receiver means adapted for receiving radio frequency signals from the sectored antenna array including signal strength detector means for producing a peak signal strength value representative of the strength of the radio frequency signal being received;
   (c) means for sequentially coupling the individual antenna sectors to said receiver means thereby scanning the antenna array means, and having scan control means for controlling scanning, including storing means for storing peak signal strength values from the receiver during scanning,
   comparator means for comparing said peak signal strength values to a reference level and generating a control signal in response to a predetermined relationship therebetween,
   scan means for general scanning of the antenna array means and storing of the peak signal strength value from each sector in said storing means, for terminating the scanning after a first time interval in response to the control signal, and then scanning only a number of selected sectors less than said plurality for a second time interval, and for inhibiting the scanning and coupling the receiver to a selected one of the selected sectors.

2. The communication system of claim 1 wherein the scan means reverts from inhibiting the scanning to general scanning in response to the signal level from the sector to which the receiver is coupled falling to a predetermined level for a predetermined time period.

3. The communication system of claim 1 further comprising means to squelch output from the receiver except when the scan control means is inhibiting the scan.

4. The communication system of claim 1 wherein the storing means further comprises:
   a first storage array, having a storage cell corresponding to each sector, for storing the peak signal strength value from each sector during the scanning modes,
   a second storage array, having a storage cell corresponding to each sector, for storing therein a reference level corresponding to each sector; and
   wherein the comparator means generates the control signal in response to the peak signal level for at least one sector stored in the first array exceeding the reference level for that sector stored in the second array by a predetermined value.

5. The communication system of claim 4 further comprising updating means for periodically transferring stored sector signal strength values for each sector from the first storage array to the second storage array when the scan means is performing the general scan of the antenna array.

6. The communication system of claim 4 wherein the selected sectors include that sector whose first array stored value exceeds its second array stored value by the greatest amount, and those sectors in a predetermined orientation with respect to said sector.

7. The communication system of claim 6 wherein the receiver is coupled to that selectively scanned sector whose first array stored signal level exceeds the second array stored reference level by the greatest amount.

8. The communication system of claim 1 wherein the receiver means comprises means for detecting the presence of a coded signal on the received radio frequency signal.

9. The communication system of claim 8 wherein the scan means continues inhibiting the scanning only if the radio frequency signal from the selected sector contains said coded signal, the scan means otherwise reverting to general scanning.

10. The communication system of claim 5 wherein the receiver means comprises means for detecting the presence of a coded signal on the received radio frequency signal.

11. The communication system of claim 10 wherein the scan means continues inhibiting the scanning only if the radio frequency signal from the selected sector contains said coded signal the scan means otherwise reverting to general scanning.

12. The communication system of claim 11 wherein the updating means further comprises means for transferring the stored sector strength values from the first storage array to the second storage array in response to the scan means reverting to general scanning as a result of the signal from said selected sector initially failing to contain said coded signal.

13. The communication system of claim 11 or 12 wherein the updating means further comprises means for zeroing the first storage array in response to the scan means reverting to general scanning as a result of the loss of said coded signal from said selected sector for a predetermined minimum time.

14. The communication system of claim 5 or 12 wherein the means for transferring performs a nonlinear transfer of stored peak signal strength values from the first storage array to the second storage array.

15. The method of receiving radio frequency signals with a multisectored antenna array and a receiver, comprising the steps of:
   (a) scanning the full array by sequentially sampling the radio frequency signal from each sector;
   (b) detecting the strength of the sampled signal from each sector;
   (c) comparing said signal strengths to a reference level and determining whether the signal strength level of at least one sector exceeds said reference level;
   (d) continuing scan of all sectors for a first time interval subsequent to determining that a sector signal strength exceeds said reference level;
   (e) scanning only a number of selected sectors of the antenna array which is less than the full array at the conclusion of the first time interval for a second time internal; and
   (f) inhibiting scan following said second time interval and coupling the receiver to a selected one of the selected sectors.

16. The method of claim 15 further comprising the step of scanning the full array after said inhibiting scan step in response to the detected signal strength of the sector to which the receiver is coupled reducing to a predetermined level for a predetermined time interval.

17. The method of claim 15 further comprising the step of:

squelching the receiver output except during the inhibiting scan step.

18. The method of claim 15 wherein the comparing step comprises the steps of:
(1) storing the peak signal strength level detected from each sector during scanning in a first storage array,
(2) storing a reference level for each sector in a second storage array, and
(3) comparing the value stored for each sector in the first array with those stored in second array and determining the condition of at least one sector having a signal in its first array exceeding its reference level in the second array by a predetermined amount to thereby activate the continuing scan step.

19. The method of claim 18 wherein the step of scanning only selected sectors comprises the steps of:
(a) selecting for further scan that sector whose first array stored signal exceeds its second array reference level by the greatest amount and
(b) selecting for further scan those sectors which are in a predetermined orientation with respect to said selected sector.

20. The method of claim 18 wherein the step of inhibiting scan further comprises the step of coupling the receiver to that one of the selected sectors whose first array stored signal exceeds its second array reference level by the greatest amount.

21. The method of claim 15 wherein the inhibiting scan step comprises the steps of:
(a) detecting the presence of a coded signal on the selected sector radio frequency signal,
(b) inhibiting scan if said selected sector signal contains said coded signal, and
(c) reverting to the step of scanning the full array if said selected sector signal fails to contain said coded signal.

22. The method of claim 18 wherein the inhibiting scan step comprises the steps of:
(a) detecting the presence of a coded signal on the selected sector radio frequency signal,
(b) inhibiting scan if said selected sector signal contains said coded signal, and
(c) reverting to the step of scanning the full array if said selected sector signal fails to contain said coded signal.

23. The method of claim 22 wherein the comparing step comprises the further step of:

transferring the stored peak signal strength levels from the first storage array to the second storage array such that said transferred signals become the reference levels, in response to the inhibiting scan step reverting to the step of scanning the full array as a result of the selected sector signal initially failing to contain said coded signal.

24. The method of claim 22 or 23 wherein the comparing step comprises the further step of:

zeroing the first storage array in response to the inhibiting scan step reverting to the step of scanning the full array as a result of the loss of said coded signal from the selected sector signal for a predetermined period of time.

25. The method of claim 23 wherein the comparing step further comprises the step of periodically transferring the first array stored signal strength levels to the second storage array, such that the transferred signals become the reference level signals, during the step of scanning the full array.

26. The method of claim 23 or 25 wherein the transferring step further comprises:

a nonlinear transformation of the first array stored signal strength levels while said first array levels are being transferred to the second storage array such that the transfer is nonlinear.

27. The method of receiving radio frequency signals with a multisectored antenna array and a receiver, comprising the steps of:
(a) scanning the full array by sequentially sampling the radio frequency signal from each sector;
(b) detecting the strength of the sampled signal from each sector;
(c) comparing said signal strengths to a reference level and determining whether the signal strength level of at least one sector exceeds said reference level, and periodically updating the reference level utilizing a nonlinear transformation of the sampled signal from each sector;
(d) continuing scan of the antenna sectors for a time interval subsequent to determining that a sector signal strength exceeds said reference level;
(e) inhibiting scan following said time interval and coupling the receiver to a selected one of the antenna sectors.

28. The method of claim 27 further comprising the step of:

scanning the full array after said inhibiting scan step in response to the detected signal strength of the sector to which the receiver is coupled reducing to a predetermined level for a predetermined time interval.

29. The method of claim 27 further comprising the step of:

squelching the receiver output except during the inhibiting scan step.

30. The method of claim 27 wherein the comparing step comprises the steps of:
(1) storing the peak signal strength level detected from each sector during scanning in a first storage array,
(2) storing a reference level for each sector in a second storage array, and
(3) comparing the value stored for each sector in the first array with those stored in second array and determining the condition of at least one sector having a signal in its first array exceeding its reference level in the second array by a predetermined amount to thereby activate the continuing scan step.

31. The method of claim 30 wherein the step of inhibiting scan further comprises the step of coupling the receiver to that one of the selected sectors whose first array stored signal exceeds its second array reference level by the greatest amount.

32. The method of claim 27 wherein the inhibiting scan step comprises the steps of:
(a) detecting the presence of a coded signal on the selected sector radio frequency signal,
(b) inhibiting scan if said selected sector signal contains said coded signal, and
(c) reverting to the step of scanning the full array if said selected sector signal fails to contain said coded signal.

33. The method of claim 30 wherein the inhibiting scan step comprises the steps of:
(a) detecting the presence of a coded signal on the selected sector radio frequency signal,
(b) inhibiting scan if said selected sector signal contains said coded signal, and
(c) reverting to the step of scanning the fully array if said selected sector signal fails to contain said coded signal.

34. The method of claim 33 wherein the comparing step comprises the further step of:
transferring, utilizing the nonlinear transformation, the stored peak signal strength levels from the first storage array to the second storage array such that said transferred signals become the reference levels, in response to the inhibiting scan step reverting to the step of scanning the fully array as a result of the selected sector signal initially failing to contain said coded signal.

35. The method of claim 33 or 34 wherein the comparing step comprises the further step of:
zeroing the first storage array in response to the inhibiting scan step reverting to the step of scanning the full array as a result of the loss of said coded signal from the selected sector signal for a predetermined period of time.

* * * * *